United States Patent
Fread et al.

(10) Patent No.: US 11,392,095 B2
(45) Date of Patent: Jul. 19, 2022

(54) BUILDING CONTROL SYSTEM WITH CENTRAL PLANT MODEL GENERATION

(71) Applicant: Johnson Controls Tyco IP Holdings LLP, Milwaukee, WI (US)

(72) Inventors: Jared W. Fread, Milwaukee, WI (US); Graeme Willmott, Milwaukee, WI (US); Ryan C. Beaty, Milwaukee, WI (US); Shawn A. Schlagenhaft, Fond du Lac, WI (US)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 135 days.

(21) Appl. No.: 16/428,662

(22) Filed: May 31, 2019

(65) Prior Publication Data

US 2020/0379418 A1   Dec. 3, 2020

(51) Int. Cl.
| | | |
|---|---|---|
| *G05B 13/04* | (2006.01) | |
| *G01D 4/16* | (2006.01) | |
| *G06F 9/451* | (2018.01) | |
| *G06Q 50/06* | (2012.01) | |

(52) U.S. Cl.
CPC ............ *G05B 13/042* (2013.01); *G01D 4/16* (2013.01); *G06F 9/453* (2018.02); *G06Q 50/06* (2013.01)

(58) Field of Classification Search
CPC ................................. G01D 4/16; G06Q 50/06
USPC ...................................................... 700/291
See application file for complete search history.

(56) References Cited

U.S. PATENT DOCUMENTS

| | | | |
|---|---|---|---|
| 10,101,731 B2 | 10/2018 | Asmus et al. | |
| 2012/0130556 A1* | 5/2012 | Marhoefer | H02J 3/382 700/291 |
| 2014/0067142 A1* | 3/2014 | Steven | H02J 3/381 700/291 |
| 2015/0316907 A1 | 11/2015 | Elbsat et al. | |
| 2016/0061469 A1* | 3/2016 | Albonesi | H02J 3/14 700/276 |
| 2017/0103483 A1* | 4/2017 | Drees | G05B 13/021 |
| 2017/0104345 A1 | 4/2017 | Wenzel et al. | |
| 2019/0024918 A1* | 1/2019 | Brissette | H05B 47/11 |
| 2019/0377305 A1* | 12/2019 | Petrus | G05B 13/041 |

\* cited by examiner

*Primary Examiner* — Md Azad
(74) *Attorney, Agent, or Firm* — Foley & Lardner LLP

(57) ABSTRACT

A control system for a central plant having devices serving energy loads of a building. The control system includes a central plant optimizer wizard generator that receives user input and generates a central plant model for the control system. The central plant optimizer wizard generator includes an equipment model generator that receives user input and generates equipment models for the devices in the central plant, a device layer generator that generates device layers, an asset layer generator that generates asset layers, and a scaled load profile generator that generates a scaled building load profile of the building using the asset layers and the user data. The central plant optimizer wizard generator generates the central plant model using the asset layers and the scaled building load profile. A demand response optimizer uses the central plant model to determine control decisions for the devices included in the central plant.

20 Claims, 12 Drawing Sheets

BUILDING CONTROL SYSTEM WITH CENTRAL PLANT MODEL GENERATION

BACKGROUND

The present disclosure relates generally to a central plant or central energy facility configured to serve the energy loads of a building or campus. The present disclosure relates more particular to a central plant with an asset allocator configured to determine an optimal distribution of the energy loads across various subplants of the central plant.

A central plant typically include multiple subplants configured to serve different types of energy loads. For example, a central plant may include a chiller subplant configured to serve cooling loads, a heater subplant configured to serve heating loads, and/or an electricity subplant configured to serve electric loads. A central plant purchases resources from utilities to run the subplants to meet the loads.

A central plant uses models of the devices included in the central plant, their relationships, and the building load profile in order to determine optimal control signals for the devices. It can be difficult and time-consuming for a user to generate the models for a central plant having many devices.

SUMMARY

One implementation of the present disclosure is a system for a central plant including devices that operate to serve energy loads of a building using a central plant model. The system includes a central plant optimizer wizard generator configured to receive user inputs and generate the central plant model for use by the system for the central plant. The central plant optimizer wizard generator includes an equipment model generator configured to receive the user inputs and generate equipment models associated with the devices, a device layer generator configured to generate device layers including the devices and the equipment models, an asset layer generator configured to generate asset layers using the device layers generated by the device layer generator, and a scaled load profile generator configured to generate a scaled building load profile of the building using the asset layers generated by the asset layer generator and the user inputs. The central plant optimizer wizard generator is configured to generate the central plant model using the asset layers generated by the asset layer generator and the scaled building load profile generated the scaled load profile generator. The system also includes a demand response optimizer configured to use the central plant model generated by the central plant optimizer wizard generator to determine control decisions for the devices included in the central plant.

In some embodiments, the equipment model generator is configured to generate the equipment models by retrieving an existing equipment model from an equipment model dictionary.

In some embodiments, the equipment model generator is configured to generate the equipment models by calculating a generic equipment model using the user inputs defining design parameters of the devices.

In some embodiments, the device layer generator is configured to generate the device layers and generate device nodes for each of the device layers. Each of the device nodes is located between the devices included in the device layers.

In some embodiments, the asset layer generator is configured to generate subplants comprising the devices included in the device layers.

In some embodiments, the asset layer generator is further configured to generate a resource-to-resource coefficient for each of the subplants and generate a subplant model using the resource-to-resource coefficient.

In some embodiments, the scaled load profile generator is further configured to determine a normalized load of the building based on a geographical location of the building included in the user inputs, determine a maximum resource production capacity value of the devices included in the asset layer, and calculate the scaled building load profile using the normalized and the maximum resource production capacity value.

Another implementation of the present disclosure is a method for controlling a central plant having devices operating to serve energy loads of a building using a central plant model. The method involves receiving user inputs including device data of the devices in the central plant and central plant data, generating equipment models associated with the devices, generating device layers including the devices and the equipment models associated with the devices included in the device layers, generating an asset layer using the device layers, generating a scaled building load profile of the building using the asset layer and the user inputs, generating the central plant model using the asset layer and the scaled building load profile, determining control decisions for the devices included in the central plant, and controlling the devices included in the central plant using the control decisions.

In some embodiments, generating the equipment models involves retrieving an existing equipment model from an equipment model dictionary for the devices included in the central plant.

In some embodiments, generating the equipment models involves calculating a generic equipment model using the user inputs for the devices included in the central plant.

In some embodiments, generating the device layers involves generating device nodes for each of the device layers. Each of the device nodes is located between the devices included in the device layers.

In some embodiments, generating the asset layer using the device layers further involves generating subplants comprising the devices included in the device layers.

In some embodiments, generating the subplants further involves calculating a resource-to-resource coefficient for each of the subplants and generating a subplant model using the resource-to-resource coefficient for each of the subplants.

In some embodiments, generating the scaled building load profile of the building further involves determining a normalized load of the building based on a geographical location of the building included in the user inputs, determining a maximum resource production capacity value of the devices included in the asset layer, and calculating the scaled building load profile using the normalized and the maximum resource production capacity value.

Yet another implementation of the present disclosure is a control system for a central plant having that operate to serve energy loads of a building using a central plant model. The control system includes a central plant optimizer wizard generator configured to receive user inputs and generate the central plant model for use by the control system for the central plant. The central plant optimizer wizard generator includes an equipment model generator configured to receive the user inputs and generate equipment models associated with the devices included in the central plant, a device layer generator configured to generate device layers including the devices and the equipment models associated with the devices included in the device layers, an asset layer generator configured to generate asset layers including subplants including the devices using the device layers generated by the device layer generator, a scaled load profile generator configured to generate a scaled building load profile of the building using the asset layers generated by the asset layer generator and the user inputs. The central plant optimizer wizard is configured to generate the central plant model using the asset layers generated by the asset layer generator and the scaled building load profile generated the scaled load profile generator. The control system also includes a demand response optimizer configured to use the central plant model generated by the central plant optimizer wizard generator to determine control decisions for the devices included in the central plant.

In some embodiments, the equipment model generator is configured to generate the equipment models by retrieving an existing equipment model from an equipment model dictionary.

In some embodiments, the equipment model generator is configured to generate the equipment models by calculating a generic equipment model using the user inputs defining design parameters of the devices.

In some embodiments, the device layer generator is configured to generate the device layers and generate device nodes for each of the device layers. Each of the device nodes is located between the devices included in the device layers.

In some embodiments, the asset layer generator is configured to generate the asset layers including the subplants by generating a resource-to-resource coefficient for each of the subplants and generating a subplant model using the resource-to-resource coefficient.

In some embodiments, the scaled load profile generator is further configured to determine a normalized load of the building based on a geographical location of the building included in the user inputs, determine a maximum resource production capacity value of the devices included in the asset layers, and calculate the scaled building load profile using the normalized and the maximum resource production capacity value.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Figure 1:
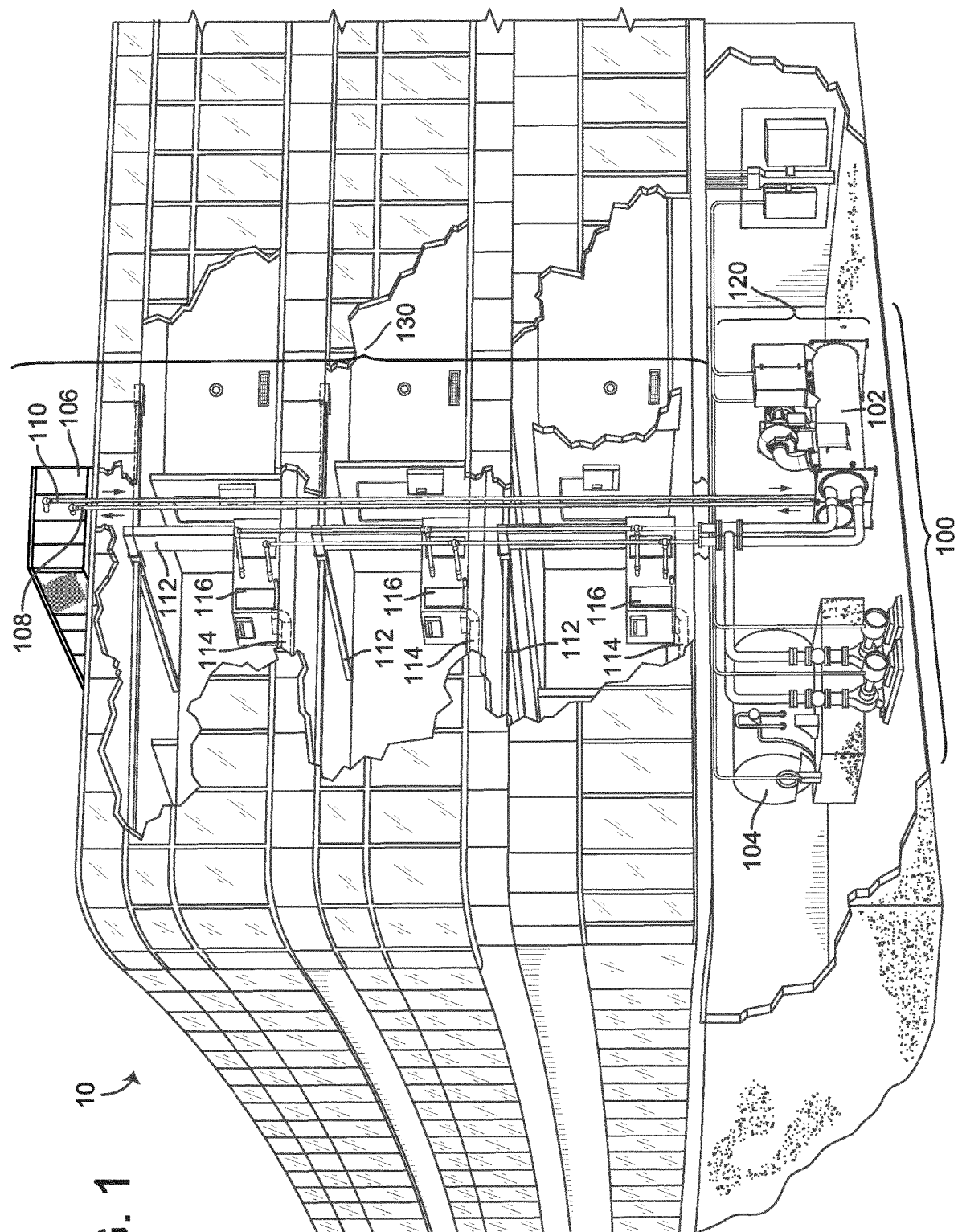
FIG. 1 is a drawing of a building equipped with a HVAC system, according to an exemplary embodiment.

Referring generally to the FIGURES, a central plant with an asset allocator and components thereof are shown, according to various exemplary embodiments. The asset allocator can be configured to manage energy assets such as central plant equipment, battery storage, and other types of equipment configured to serve the energy loads of a building. The asset allocator can determine an optimal distribution of heating, cooling, electricity, and energy loads across different subplants (i.e., equipment groups) of the central plant capable of producing that type of energy.

In some embodiments, the asset allocator is configured to control the distribution, production, storage, and usage of resources in the central plant. The asset allocator can be configured to minimize the economic cost (or maximize the economic value) of operating the central plant over a duration of an optimization period. The economic cost may be defined by a cost function $J(x)$ that expresses economic cost as a function of the control decisions made by the asset allocator. The cost function $J(x)$ may account for the cost of resources purchased from various sources, as well as the revenue generated by selling resources (e.g., to an energy grid) or participating in incentive programs.

The asset allocator can be configured to define various sources, subplants, storage, and sinks. These four categories of objects define the assets of a central plant and their interaction with the outside world. Sources may include commodity markets or other suppliers from which resources such as electricity, water, natural gas, and other resources can be purchased or obtained. Sinks may include the requested loads of a building or campus as well as other types of resource consumers. Subplants are the main assets of a central plant. Subplants can be configured to convert resource types, making it possible to balance requested loads from a building or campus using resources purchased from the sources. Storage can be configured to store energy or other types of resources for later use.

In some embodiments, the asset allocator performs an optimization process determine an optimal set of control decisions for each time step within the optimization period. The control decisions may include, for example, an optimal amount of each resource to purchase from the sources, an optimal amount of each resource to produce or convert using the subplants, an optimal amount of each resource to store or remove from storage, an optimal amount of each resource to sell to resources purchasers, and/or an optimal amount of each resource to provide to other sinks. In some embodiments, the asset allocator is configured to optimally dispatch all campus energy assets (i.e., the central plant equipment) in order to meet the requested heating, cooling, and electrical loads of the campus for each time step within the optimization period. These and other features of the asset allocator are described in greater detail below.

Building and HVAC System

Referring now to FIG. 1, a perspective view of a building 10 is shown. Building 10 can be served by a building management system (BMS). A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. An example of a BMS which can be used to monitor and control building 10 is described in U.S. patent application Ser. No. 14/717,593 filed May 20, 2015, the entire disclosure of which is incorporated by reference herein.

The BMS that serves building 10 may include a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 can be replaced with or supplemented by a central plant or central energy facility (described in greater detail with reference to FIG. 2). An example of an airside system which can be used in HVAC system 100 is described in greater detail with reference to FIG. 3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant

Figure 2:
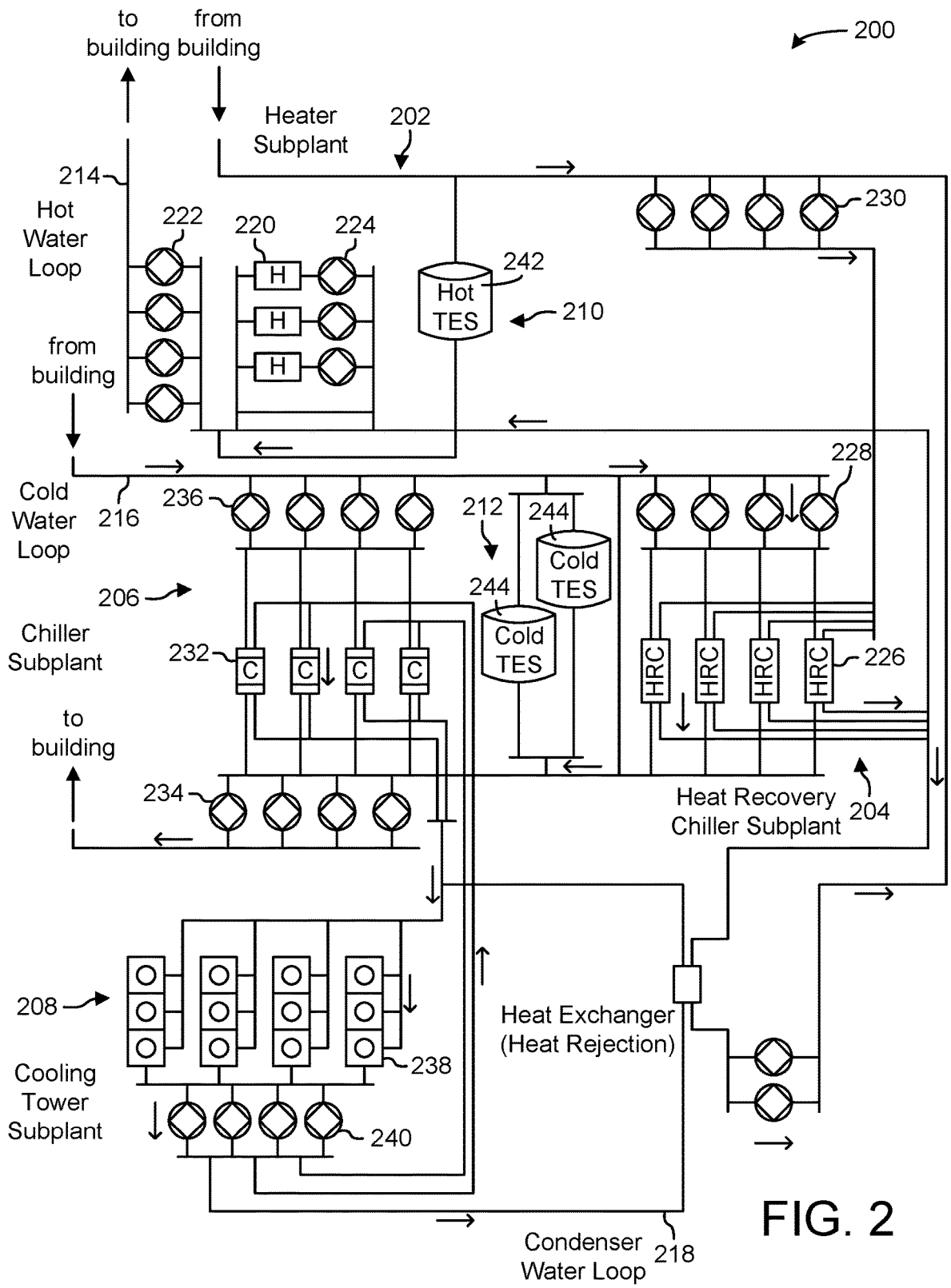
FIG. 2 is a block diagram of a central plant which can be used to serve the energy loads of the building of FIG. 1, according to an exemplary embodiment.

Referring now to FIG. 2, a block diagram of a central plant 200 is shown, according to some embodiments. In various embodiments, central plant 200 can supplement or replace waterside system 120 in HVAC system 100 or can be implemented separate from HVAC system 100. When implemented in HVAC system 100, central plant 200 can include a subset of the HVAC devices in HVAC system 100 (e.g., boiler 104, chiller 102, pumps, valves, etc.) and may operate to supply a heated or chilled fluid to AHU 106. The HVAC devices of central plant 200 can be located within building 10 (e.g., as components of waterside system 120) or at an offsite location such as a central energy facility that serves multiple buildings.

Central plant 200 is shown to include a plurality of subplants 202-208. Subplants 202-208 can be configured to convert energy or resource types (e.g., water, natural gas, electricity, etc.). For example, subplants 202-208 are shown to include a heater subplant 202, a heat recovery chiller subplant 204, a chiller subplant 206, and a cooling tower subplant 208. In some embodiments, subplants 202-208 consume resources purchased from utilities to serve the energy loads (e.g., hot water, cold water, electricity, etc.) of a building or campus. For example, heater subplant 202 can be configured to heat water in a hot water loop 214 that circulates the hot water between heater subplant 202 and building 10. Similarly, chiller subplant 206 can be configured to chill water in a cold water loop 216 that circulates the cold water between chiller subplant 206 building 10.

Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. In various embodiments, central plant 200 can include an electricity subplant (e.g., one or more electric generators) configured to generate electricity or any other type of subplant configured to convert energy or resource types.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-208 to receive further heating or cooling.

Although subplants 202-208 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-208 may provide heating and/or cooling directly to the building or campus without requiring an intermediate heat transfer fluid. These and other variations to central plant 200 are within the teachings of the present disclosure.

Each of subplants 202-208 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

In some embodiments, one or more of the pumps in central plant 200 (e.g., pumps 222, 224, 228, 230, 234, 236, and/or 240) or pipelines in central plant 200 include an isolation valve associated therewith. Isolation valves can be integrated with the pumps or positioned upstream or downstream of the pumps to control the fluid flows in central plant 200. In various embodiments, central plant 200 can include more, fewer, or different types of devices and/or subplants based on the particular configuration of central plant 200 and the types of loads served by central plant 200.

Still referring to FIG. 2, central plant 200 is shown to include hot thermal energy storage (TES) 210 and cold thermal energy storage (TES) 212. Hot TES 210 and cold TES 212 can be configured to store hot and cold thermal energy for subsequent use. For example, hot TES 210 can include one or more hot water storage tanks 242 configured to store the hot water generated by heater subplant 202 or heat recovery chiller subplant 204. Hot TES 210 may also include one or more pumps or valves configured to control the flow rate of the hot water into or out of hot TES tank 242.

Similarly, cold TES 212 can include one or more cold water storage tanks 244 configured to store the cold water generated by chiller subplant 206 or heat recovery chiller subplant 204. Cold TES 212 may also include one or more pumps or valves configured to control the flow rate of the cold water into or out of cold TES tanks 244. In some embodiments, central plant 200 includes electrical energy storage (e.g., one or more batteries) or any other type of device configured to store resources. The stored resources can be purchased from utilities, generated by central plant 200, or otherwise obtained from any source.

Airside System

Figure 3:
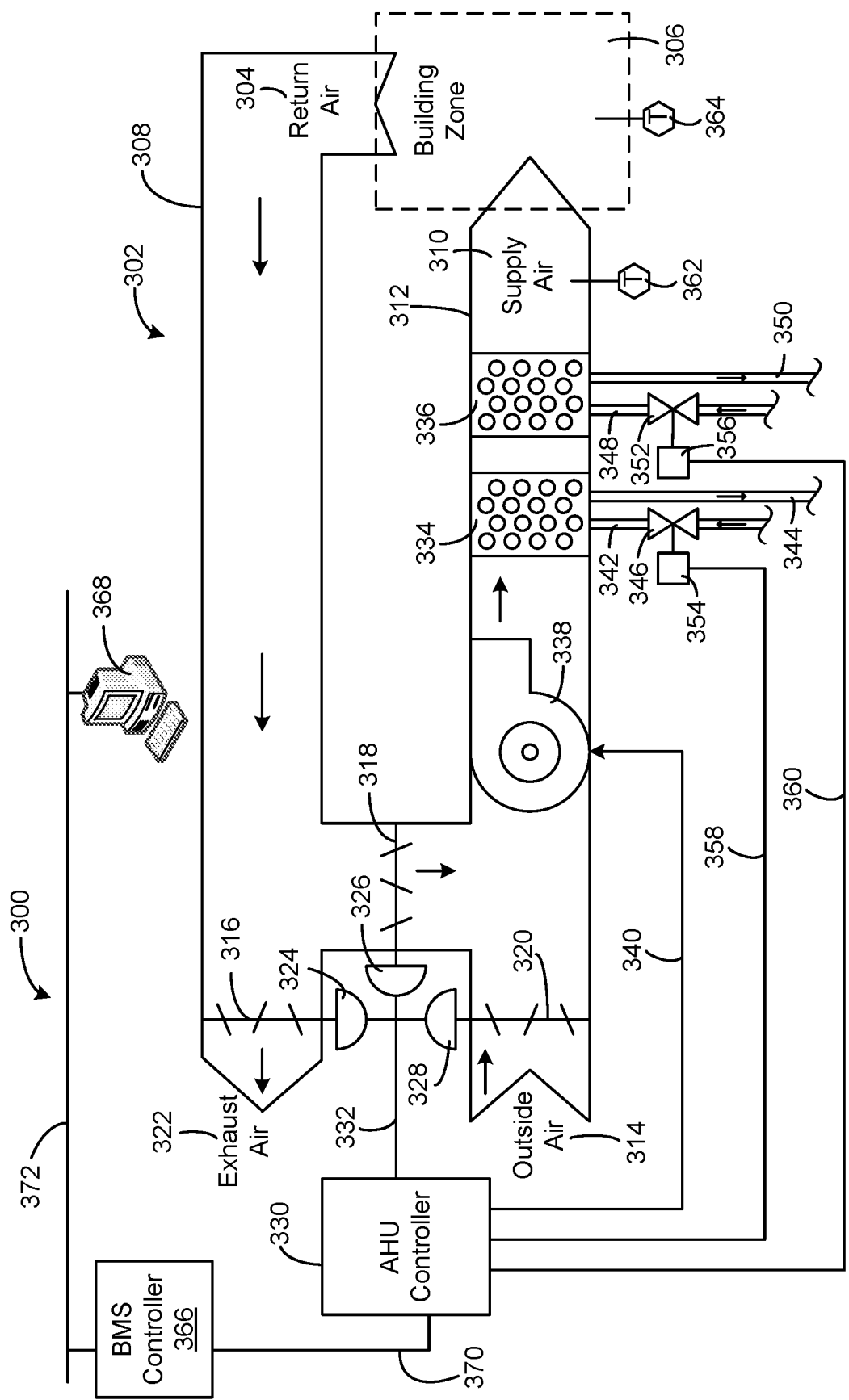
FIG. 3 is a block diagram of an airside system which can be implemented in the building of FIG. 1, according to an exemplary embodiment.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by central plant 200.

Airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from central plant 200 (e.g., from cold water loop 216) via piping 342 and may return the chilled fluid to central plant 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from central plant 200 (e.g., from hot water loop 214) via piping 348 and may return the heated fluid to central plant 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, central plant 200, HVAC system 100, and/or other controllable systems that serve building 10. BMS controller 366 may communicate with multiple downstream building systems or subsystems (e.g., HVAC system 100, a security system, a lighting system, central plant 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Asset Allocation System

Figure 4:
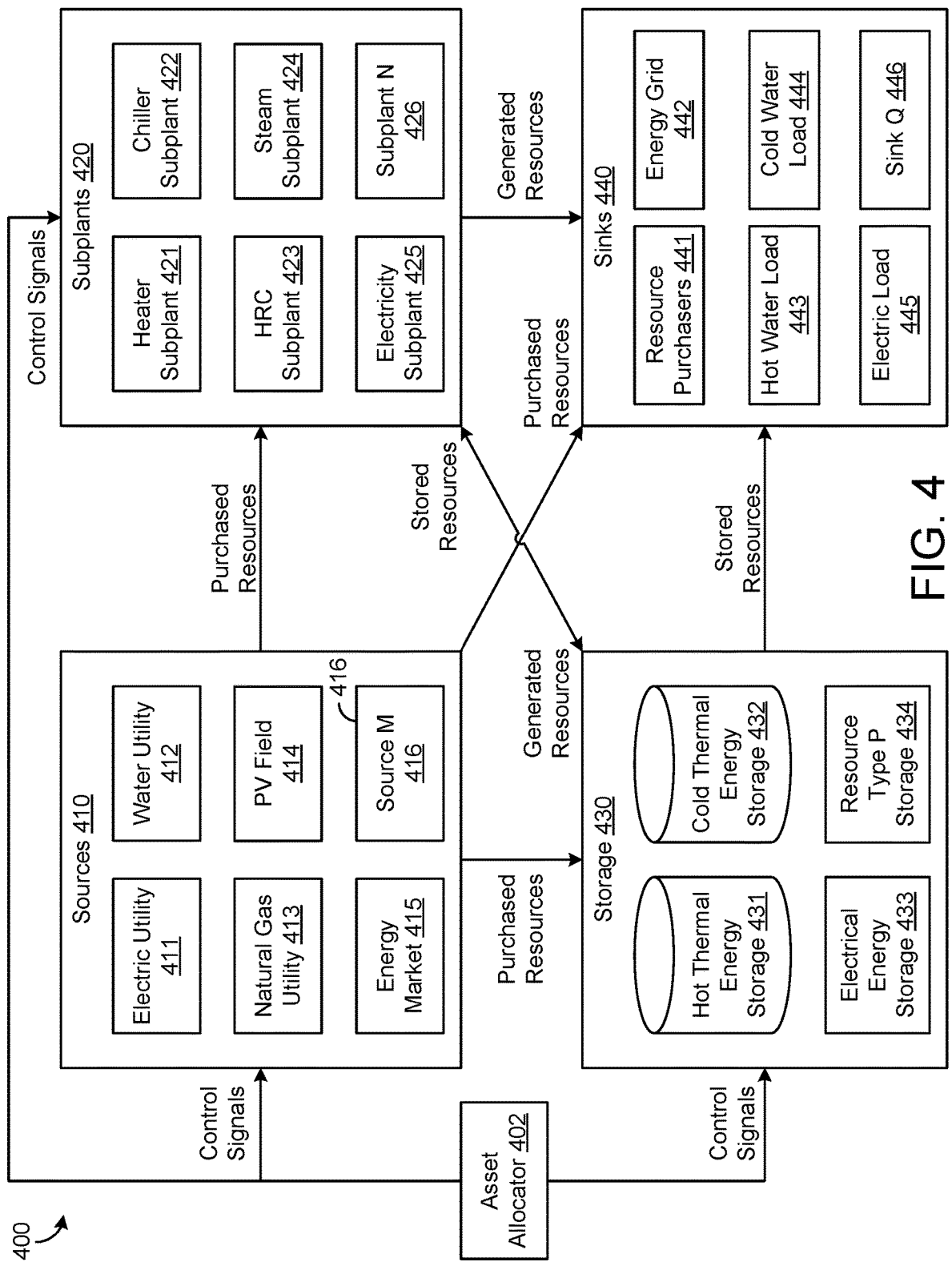
FIG. 4 is a block diagram of an asset allocation system including sources, subplants, storage, sinks, and an asset allocator configured to optimize the allocation of these assets, according to an exemplary embodiment.

Referring now to FIG. 4, a block diagram of an asset allocation system 400 is shown, according to an exemplary embodiment. Asset allocation system 400 can be configured to manage energy assets such as central plant equipment, battery storage, and other types of equipment configured to serve the energy loads of a building. Asset allocation system 400 can determine an optimal distribution of heating, cooling, electricity, and energy loads across different subplants (i.e., equipment groups) capable of producing that type of energy. In some embodiments, asset allocation system 400 is implemented as a component of central plant 200 and interacts with the equipment of central plant 200 in an online operational environment (e.g., performing real-time control of the central plant equipment). In other embodiments, asset allocation system 400 can be implemented as a component of a planning tool (described with reference to FIGS. 7-8) and can be configured to simulate the operation of a central plant over a predetermined time period for planning, budgeting, and/or design considerations.

Asset allocation system 400 is shown to include sources 410, subplants 420, storage 430, and sinks 440. These four categories of objects define the assets of a central plant and their interaction with the outside world. Sources 410 may include commodity markets or other suppliers from which resources such as electricity, water, natural gas, and other resources can be purchased or obtained. Sources 410 may provide resources that can be used by asset allocation system 400 to satisfy the demand of a building or campus. For example, sources 410 are shown to include an electric utility 411, a water utility 412, a natural gas utility 413, a photovoltaic (PV) field (e.g., a collection of solar panels), an energy market 415, and source M 416, where M is the total number of sources 410. Resources purchased from sources 410 can be used by subplants 420 to produce generated resources (e.g., hot water, cold water, electricity, steam, etc.), stored in storage 430 for later use, or provided directly to sinks 440.

Subplants 420 are the main assets of a central plant. Subplants 420 are shown to include a heater subplant 421, a chiller subplant 422, a heat recovery chiller subplant 423, a steam subplant 424, an electricity subplant 425, and subplant N, where N is the total number of subplants 420. In some embodiments, subplants 420 include some or all of the subplants of central plant 200, as described with reference to FIG. 2. For example, subplants 420 can include heater subplant 202, heat recovery chiller subplant 204, chiller subplant 206, and/or cooling tower subplant 208.

Subplants 420 can be configured to convert resource types, making it possible to balance requested loads from the building or campus using resources purchased from sources 410. For example, heater subplant 421 may be configured to generate hot thermal energy (e.g., hot water) by heating water using electricity or natural gas. Chiller subplant 422 may be configured to generate cold thermal energy (e.g., cold water) by chilling water using electricity. Heat recovery chiller subplant 423 may be configured to generate hot thermal energy and cold thermal energy by removing heat from one water supply and adding the heat to another water supply. Steam subplant 424 may be configured to generate steam by boiling water using electricity or natural gas. Electricity subplant 425 may be configured to generate electricity using mechanical generators (e.g., a steam turbine, a gas-powered generator, etc.) or other types of electricity-generating equipment (e.g., photovoltaic equipment, hydroelectric equipment, etc.).

The input resources used by subplants 420 may be provided by sources 410, retrieved from storage 430, and/or generated by other subplants 420. For example, steam subplant 424 may produce steam as an output resource. Electricity subplant 425 may include a steam turbine that uses the steam generated by steam subplant 424 as an input resource to generate electricity. The output resources produced by subplants 420 may be stored in storage 430, provided to sinks 440, and/or used by other subplants 420. For example, the electricity generated by electricity subplant 425 may be stored in electrical energy storage 433, used by chiller subplant 422 to generate cold thermal energy, used to satisfy the electric load 445 of a building, or sold to resource purchasers 441.

Storage 430 can be configured to store energy or other types of resources for later use. Each type of storage within storage 430 may be configured to store a different type of resource. For example, storage 430 is shown to include hot thermal energy storage 431 (e.g., one or more hot water storage tanks), cold thermal energy storage 432 (e.g., one or more cold thermal energy storage tanks), electrical energy storage 433 (e.g., one or more batteries), and resource type P storage 434, where P is the total number of storage 430. In some embodiments, storage 430 include some or all of the storage of central plant 200, as described with reference to FIG. 2. In some embodiments, storage 430 includes the heat capacity of the building served by the central plant. The resources stored in storage 430 may be purchased directly from sources 410 or generated by subplants 420.

In some embodiments, storage 430 is used by asset allocation system 400 to take advantage of price-based demand response (PBDR) programs. PBDR programs encourage consumers to reduce consumption when generation, transmission, and distribution costs are high. PBDR programs are typically implemented (e.g., by sources 410) in the form of energy prices that vary as a function of time. For example, some utilities may increase the price per unit of electricity during peak usage hours to encourage customers to reduce electricity consumption during peak times. Some utilities also charge consumers a separate demand charge based on the maximum rate of electricity consumption at any time during a predetermined demand charge period.

Advantageously, storing energy and other types of resources in storage 430 allows for the resources to be purchased at times when the resources are relatively less expensive (e.g., during non-peak electricity hours) and stored for use at times when the resources are relatively more expensive (e.g., during peak electricity hours). Storing resources in storage 430 also allows the resource demand of the building or campus to be shifted in time. For example, resources can be purchased from sources 410 at times when the demand for heating or cooling is low and immediately converted into hot or cold thermal energy by subplants 420. The thermal energy can be stored in storage 430 and retrieved at times when the demand for heating or cooling is high. This allows asset allocation system 400 to smooth the resource demand of the building or campus and reduces the maximum required capacity of subplants 420. Smoothing the demand also asset allocation system 400 to reduce the peak electricity consumption, which results in a lower demand charge.

In some embodiments, storage 430 is used by asset allocation system 400 to take advantage of incentive-based demand response (IBDR) programs. IBDR programs provide incentives to customers who have the capability to store energy, generate energy, or curtail energy usage upon request. Incentives are typically provided in the form of monetary revenue paid by sources 410 or by an independent service operator (ISO). IBDR programs supplement traditional utility-owned generation, transmission, and distribution assets with additional options for modifying demand load curves. For example, stored energy can be sold to resource purchasers 441 or an energy grid 442 to supplement the energy generated by sources 410. In some instances, incentives for participating in an IBDR program vary based on how quickly a system can respond to a request to change power output/consumption. Faster responses may be compensated at a higher level. Advantageously, electrical energy storage 433 allows system 400 to quickly respond to a request for electric power by rapidly discharging stored electrical energy to energy grid 442.

Sinks 440 may include the requested loads of a building or campus as well as other types of resource consumers. For example, sinks 440 are shown to include resource purchasers 441, an energy grid 442, a hot water load 443, a cold water load 444, an electric load 445, and sink Q, where Q is the total number of sinks 440. A building may consume various resources including, for example, hot thermal energy (e.g., hot water), cold thermal energy (e.g., cold water), and/or electrical energy. In some embodiments, the resources are consumed by equipment or subsystems within the building (e.g., HVAC equipment, lighting, computers and other electronics, etc.). The consumption of each sink 440 over the optimization period can be supplied as an input to asset allocation system 400 or predicted by asset allocation system 400. Sinks 440 can receive resources directly from sources 410, from subplants 420, and/or from storage 430.

Still referring to FIG. 4, asset allocation system 400 is shown to include an asset allocator 402. Asset allocator 402 may be configured to control the distribution, production, storage, and usage of resources in asset allocation system 400. In some embodiments, asset allocator 402 performs an optimization process determine an optimal set of control decisions for each time step within an optimization period. The control decisions may include, for example, an optimal amount of each resource to purchase from sources 410, an optimal amount of each resource to produce or convert using subplants 420, an optimal amount of each resource to store or remove from storage 430, an optimal amount of each resource to sell to resources purchasers 441 or energy grid 440, and/or an optimal amount of each resource to provide to other sinks 440. In some embodiments, the control decisions include an optimal amount of each input resource and output resource for each of subplants 420.

In some embodiments, asset allocator 402 is configured to optimally dispatch all campus energy assets in order to meet the requested heating, cooling, and electrical loads of the campus for each time step within an optimization horizon or optimization period of duration h. Instead of focusing on only the typical HVAC energy loads, the concept is extended to the concept of resource. Throughout this disclosure, the term "resource" is used to describe any type of commodity purchased from sources 410, used or produced by subplants 420, stored or discharged by storage 430, or consumed by sinks 440. For example, water may be considered a resource that is consumed by chillers, heaters, or cooling towers during operation. This general concept of a resource can be extended to chemical processing plants where one of the resources is the product that is being produced by the chemical processing plat.

Asset allocator 402 can be configured to operate the equipment of asset allocation system 400 to ensure that a resource balance is maintained at each time step of the optimization period. This resource balance is shown in the following equation:

$$\Sigma x_{time} = 0 \; \forall resources, \forall time \in horizon$$

where the sum is taken over all producers and consumers of a given resource (i.e., all of sources 410, subplants 420, storage 430, and sinks 440) and time is the time index. Each time element represents a period of time during which the resource productions, requests, purchases, etc. are assumed constant. Asset allocator 402 may ensure that this equation is satisfied for all resources regardless of whether that resource is required by the building or campus. For example, some of the resources produced by subplants 420 may be intermediate resources that function only as inputs to other subplants 420.

In some embodiments, the resources balanced by asset allocator 402 include multiple resources of the same type (e.g., multiple chilled water resources, multiple electricity resources, etc.). Defining multiple resources of the same type may allow asset allocator 402 to satisfy the resource balance given the physical constraints and connections of the central plant equipment. For example, suppose a central plant has multiple chillers and multiple cold water storage tanks, with each chiller physically connected to a different cold water storage tank (i.e., chiller A is connected to cold water storage tank A, chiller B is connected to cold water storage tank B, etc.). Given that only one chiller can supply cold water to each cold water storage tank, a different cold water resource can be defined for the output of each chiller. This allows asset allocator 402 to ensure that the resource balance is satisfied for each cold water resource without attempting to allocate resources in a way that is physically impossible (e.g., storing the output of chiller A in cold water storage tank B, etc.).

Asset allocator 402 may be configured to minimize the economic cost (or maximize the economic value) of operating asset allocation system 400 over the duration of the optimization period. The economic cost may be defined by a cost function J(x) that expresses economic cost as a function of the control decisions made by asset allocator 402. The cost function J(x) may account for the cost of resources purchased from sources 410, as well as the revenue generated by selling resources to resource purchasers 441 or energy grid 442 or participating in incentive programs. The cost optimization performed by asset allocator 402 can be expressed as:

$$\arg\min_{x} J(x)$$

where J(x) is defined as follows:

$$J(x) = \sum_{sources} \sum_{horizon} \text{cost}(purchase_{resource,time}, \text{time}) - \sum_{incentives} \sum_{horizon} \text{revenue}(ReservationAmount)$$

The first term in the cost function J(x) represents the total cost of all resources purchased over the optimization horizon. Resources can include, for example, water, electricity, natural gas, or other types of resources purchased from a utility or other source 410. The second term in the cost function J(x) represents the total revenue generated by participating in incentive programs (e.g., IBDR programs) over the optimization horizon. The revenue may be based on the amount of power reserved for participating in the incentive programs. Accordingly, the total cost function represents the total cost of resources purchased minus any revenue generated from participating in incentive programs.

Each of subplants 420 and storage 430 may include equipment that can be controlled by asset allocator 402 to optimize the performance of asset allocation system 400. Subplant equipment may include, for example, heating devices, chillers, heat recovery heat exchangers, cooling towers, energy storage devices, pumps, valves, and/or other devices of subplants 420 and storage 430. Individual devices of subplants 420 can be turned on or off to adjust the resource production of each subplant 420. In some embodiments, individual devices of subplants 420 can be operated at variable capacities (e.g., operating a chiller at 10% capacity or 60% capacity) according to an operating setpoint received from asset allocator 402. Asset allocator 402 can control the equipment of subplants 420 and storage 430 to adjust the amount of each resource purchased, consumed, and/or produced by system 400.

In some embodiments, asset allocator 402 minimizes the cost function while participating in PBDR programs, IBDR programs, or simultaneously in both PBDR and IBDR programs. For the IBDR programs, asset allocator 402 may use statistical estimates of past clearing prices, mileage ratios, and event probabilities to determine the revenue generation potential of selling stored energy to resource purchasers 441 or energy grid 442. For the PBDR programs, asset allocator 402 may use predictions of ambient conditions, facility thermal loads, and thermodynamic models of installed equipment to estimate the resource consumption of subplants 420. Asset allocator 402 may use predictions of the resource consumption to monetize the costs of running the equipment.

Asset allocator 402 may automatically determine (e.g., without human intervention) a combination of PBDR and/or IBDR programs in which to participate over the optimization horizon in order to maximize economic value. For example, asset allocator 402 may consider the revenue generation potential of IBDR programs, the cost reduction potential of PBDR programs, and the equipment maintenance/replacement costs that would result from participating in various combinations of the IBDR programs and PBDR programs. Asset allocator 402 may weigh the benefits of participation against the costs of participation to determine an optimal combination of programs in which to participate. Advantageously, this allows asset allocator 402 to determine an optimal set of control decisions that maximize the overall value of operating asset allocation system 400.

In some embodiments, asset allocator 402 optimizes the cost function J(x) subject to the following constraint, which guarantees the balance between resources purchased, produced, discharged, consumed, and requested over the optimization horizon:

$$\sum_{sources} purchase_{resources,time} +$$
$$\sum_{subplants} produces(x_{internal,time}, x_{external,time}, v_{uncontrolled,time}) -$$
$$\sum_{subplants} consumes(x_{internal,time}, x_{external,time}, v_{uncontrolled,time}) +$$
$$\sum_{storages} discharges_{resource}(x_{internal,time}, x_{external,time}) - \sum_{sinks} requests_{resource} =$$
$$0 \; \forall \; resources, \forall \; time \in horizon$$

where $x_{internal,time}$ includes internal decision variables (e.g., load allocated to each component of asset allocation system 400), $x_{external,time}$ includes external decision variables (e.g., condenser water return temperature or other shared variables across subplants 420), and $v_{uncontrolled,time}$ includes uncontrolled variables (e.g., weather conditions).

The first term in the previous equation represents the total amount of each resource (e.g., electricity, water, natural gas, etc.) purchased from each source 410 over the optimization horizon. The second and third terms represent the total production and consumption of each resource by subplants 420 over the optimization horizon. The fourth term represents the total amount of each resource discharged from storage 430 over the optimization horizon. Positive values indicate that the resource is discharged from storage 430, whereas negative values indicate that the resource is charged or stored. The fifth term represents the total amount of each resource requested by sinks 440 over the optimization horizon. Accordingly, this constraint ensures that the total amount of each resource purchased, produced, or discharged from storage 430 is equal to the amount of each resource consumed, stored, or provided to sinks 440.

In some embodiments, additional constraints exist on the regions in which subplants 420 can operate. Examples of such additional constraints include the acceptable space (i.e., the feasible region) for the decision variables given the uncontrolled conditions, the maximum amount of a resource that can be purchased from a given source 410, and any number of plant-specific constraints that result from the mechanical design of the plant.

Asset allocator 402 may include a variety of features that enable the application of asset allocator 402 to nearly any central plant, central energy facility, combined heating and cooling facility, or combined heat and power facility. These features include broadly applicable definitions for subplants 420, sinks 440, storage 430, and sources 410; multiples of the same type of subplant 420 or sink 440; subplant resource connections that describe which subplants 420 can send resources to which sinks 440 and at what efficiency; subplant minimum turndown into the asset allocation optimization; treating electrical energy as any other resource that must be balanced; constraints that can be commissioned during runtime; different levels of accuracy at different points in the horizon; setpoints (or other decisions) that are shared between multiple subplants included in the decision vector; disjoint subplant operation regions; incentive based electrical energy programs; and high level airside models. Incorporation of these features may allow asset allocator 402 to support a majority of the central energy facilities that will be seen in the future. Additionally, it will be possible to rapidly adapt to the inclusion of new subplant types. Some of these features are described in greater detail below.

Broadly applicable definitions for subplants 420, sinks 440, storage 430, and sources 410 allow each of these components to be described by the mapping from decision variables to resources consume and resources produced. Resources and other components of system 400 do not need to be "typed," but rather can be defined generally. The mapping from decision variables to resource consumption and production can change based on extrinsic conditions. Asset allocator 420 can solve the optimization problem by simply balancing resource use and can be configured to solve in terms of consumed resource 1, consumed resource 2, produced resource 1, etc., rather than electricity consumed, water consumed, and chilled water produced. Such an interface at the high level allows for the mappings to be injected into asset allocation system 400 rather than needing them hard coded. Of course, "typed" resources and other components of system 400 can still exist in order to generate the mapping at run time, based on equipment out of service.

Incorporating multiple subplants 420 or sinks 440 of the same type allows for modeling the interconnections between subplants 420, sources 410, storage 430, and sinks 440. This type of modeling describes which subplants 420 can use resource from which sources 410 and which subplants 420 can send resources to which sinks 440. This can be visualized as a resource connection matrix (i.e., a directed graph) between the subplants 420, sources 410, sinks 440, and storage 430. Examples of such directed graphs are described in greater detail with reference to FIGS. 5A-5B. Extending this concept, it is possible to include costs for delivering the resource along a connection and also, efficiencies of the transmission (e.g., amount of energy that makes it to the other side of the connection).

In some instances, constraints arise due to mechanical problems after an energy facility has been built. Accordingly, these constraints are site specific and are often not incorporated into the main code for any of subplants 420 or the high level problem itself. Commissioned constraints allow for such constraints to be added without software updates during the commissioning phase of the project. Furthermore, if these additional constraints are known prior to the plant build, they can be added to the design tool run. This would allow the user to determine the cost of making certain design decisions.

Incorporating minimum turndown and allowing disjoint operating regions may greatly enhance the accuracy of the asset allocation problem solution as well as decrease the number of modifications to solution of the asset allocation by the low level optimization or another post-processing technique. It may be beneficial to allow for certain features to change as a function of time into the horizon. One could use the full disjoint range (most accurate) for the first four hours, then switch to only incorporating the minimum turndown for the next two days, and finally using to the linear relaxation with no binary constraints for the rest of the horizon. For example, asset allocator 402 can be given the operational domain that correctly allocates three chillers with a range of 1800 to 2500 tons. The true subplant range is then the union of [1800, 2500], [3600, 5000], and [5400, 7500]. If the range were approximated as [1800, 7500] the low level optimization or other post-processing technique would have to rebalance any solution between 2500 and 3600 or between 5000 and 5400 tons. Rebalancing is typically done heuristically and is unlikely to be optimal. Incorporating these disjoint operational domains adds binary variables to the optimization problem (described in greater detail below).

Some decisions made by asset allocator 402 may be shared by multiple elements of system 400. The condenser water setpoint of cooling towers is an example. It is possible to assume that this variable is fixed and allow the low level optimization to decide on its value. However, this does not allow one to make a trade-off between the chiller's electrical use and the tower's electrical use, nor does it allow the optimization to exceed the chiller's design load by feeding it cooler condenser water. Incorporating these extrinsic decisions into asset allocator 402 allows for a more accurate solution at the cost of computational time.

Incentive programs often require the reservation of one or more assets for a period of time. In traditional systems, these assets are typically turned over to alternative control, different than the typical resource price based optimization. Advantageously, asset allocator 402 can be configured to add revenue to the cost function per amount of resource reserved. Asset allocator 402 can then make the reserved portion of the resource unavailable for typical price based cost optimization. For example, asset allocator 402 can reserve a portion of a battery asset for frequency response. In this case, the battery can be used to move the load or shave the peak demand, but can also be reserved to participate in the frequency response program.

Central Plant Controller

Figure 5:
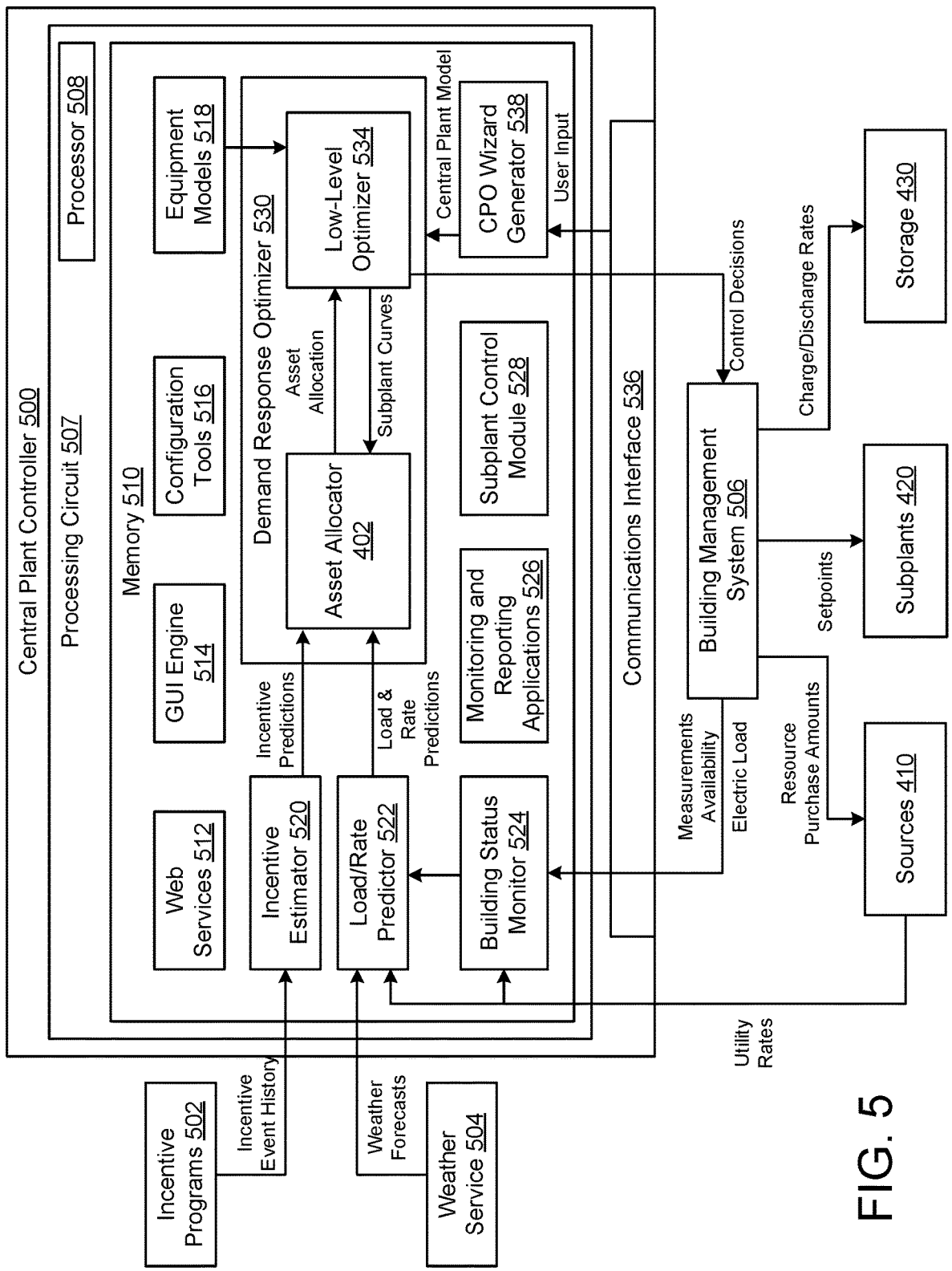
FIG. 5 is a block diagram of a central plant controller in which the asset allocator of FIG. 4 can be implemented, according to an exemplary embodiment.

Referring now to FIG. 5, a block diagram of a central plant controller 500 in which asset allocator 402 can be implemented is shown, according to an exemplary embodiment. In various embodiments, central plant controller 500 can be configured to monitor and control central plant 200, asset allocation system 400, and various components thereof (e.g., sources 410, subplants 420, storage 430, sinks 440, etc.). Central plant controller 500 is shown providing control decisions to a building management system (BMS) 506. The control decisions provided to BMS 506 may include resource purchase amounts for sources 410, setpoints for subplants 420, and/or charge/discharge rates for storage 430.

In some embodiments, BMS 506 is the same or similar to the BMS described with reference to FIG. 1. BMS 506 may be configured to monitor conditions within a controlled building or building zone. For example, BMS 506 may receive input from various sensors (e.g., temperature sensors, humidity sensors, airflow sensors, voltage sensors, etc.) distributed throughout the building and may report building conditions to central plant controller 500. Building conditions may include, for example, a temperature of the building or a zone of the building, a power consumption (e.g., electric load) of the building, a state of one or more actuators configured to affect a controlled state within the building, or other types of information relating to the controlled building. BMS 506 may operate subplants 420 and storage 430 to affect the monitored conditions within the building and to serve the thermal energy loads of the building.

BMS 506 may receive control signals from central plant controller 500 specifying on/off states, charge/discharge rates, and/or setpoints for the subplant equipment. BMS 506 may control the equipment (e.g., via actuators, power relays, etc.) in accordance with the control signals provided by central plant controller 500. For example, BMS 506 may operate the equipment using closed loop control to achieve the setpoints specified by central plant controller 500. In various embodiments, BMS 506 may be combined with central plant controller 500 or may be part of a separate building management system. According to an exemplary embodiment, BMS 506 is a METASYS® brand building management system, as sold by Johnson Controls, Inc.

Central plant controller 500 may monitor the status of the controlled building using information received from BMS5606. Central plant controller 500 may be configured to predict the thermal energy loads (e.g., heating loads, cooling loads, etc.) of the building for plurality of time steps in an optimization period (e.g., using weather forecasts from a weather service 504). Central plant controller 500 may also predict the revenue generation potential of incentive based demand response (IBDR) programs using an incentive event history (e.g., past clearing prices, mileage ratios, event probabilities, etc.) from incentive programs 502. Central plant controller 500 may generate control decisions that optimize the economic value of operating central plant 200 over the duration of the optimization period subject to constraints on the optimization process (e.g., energy balance constraints, load satisfaction constraints, etc.). The optimization process performed by central plant controller 500 is described in greater detail below.

In some embodiments, central plant controller 500 is integrated within a single computer (e.g., one server, one housing, etc.). In various other exemplary embodiments, central plant controller 500 can be distributed across multiple servers or computers (e.g., that can exist in distributed locations). In another exemplary embodiment, central plant controller 500 may have integrated with a smart building manager that manages multiple building systems and/or combined with BMS 506.

Central plant controller 500 is shown to include a communications interface 536 and a processing circuit 507. Communications interface 536 may include wired or wireless interfaces (e.g., jacks, antennas, transmitters, receivers, transceivers, wire terminals, etc.) for conducting data communications with various systems, devices, or networks. For example, communications interface 536 may include an Ethernet card and port for sending and receiving data via an Ethernet-based communications network and/or a WiFi transceiver for communicating via a wireless communications network. Communications interface 536 may be configured to communicate via local area networks or wide area networks (e.g., the Internet, a building WAN, etc.) and may use a variety of communications protocols (e.g., BACnet, IP, LON, etc.).

Communications interface 536 may be a network interface configured to facilitate electronic data communications between central plant controller 500 and various external systems or devices (e.g., BMS 506, subplants 420, storage 430, sources 410, etc.). For example, central plant controller 500 may receive information from BMS 506 indicating one or more measured states of the controlled building (e.g., temperature, humidity, electric loads, etc.) and one or more states of subplants 420 and/or storage 430 (e.g., equipment status, power consumption, equipment availability, etc.). Communications interface 536 may receive inputs from BMS 506, subplants 420, and/or storage 430 and may provide operating parameters (e.g., on/off decisions, setpoints, etc.) to subplants 420 and storage 430 via BMS 506. The operating parameters may cause subplants 420 and storage 430 to activate, deactivate, or adjust a setpoint for various devices thereof.

Still referring to FIG. 5, processing circuit 507 is shown to include a processor 508 and memory 510. Processor 508 may be a general purpose or specific purpose processor, an application specific integrated circuit (ASIC), one or more field programmable gate arrays (FPGAs), a group of processing components, or other suitable processing components. Processor 508 may be configured to execute computer code or instructions stored in memory 510 or received from other computer readable media (e.g., CDROM, network storage, a remote server, etc.).

Memory 510 may include one or more devices (e.g., memory units, memory devices, storage devices, etc.) for storing data and/or computer code for completing and/or facilitating the various processes described in the present disclosure. Memory 510 may include random access memory (RAM), read-only memory (ROM), hard drive storage, temporary storage, non-volatile memory, flash memory, optical memory, or any other suitable memory for storing software objects and/or computer instructions. Memory 510 may include database components, object code components, script components, or any other type of information structure for supporting the various activities and information structures described in the present disclosure. Memory 510 may be communicably connected to processor 508 via processing circuit 507 and may include computer code for executing (e.g., by processor 508) one or more processes described herein.

Memory 510 is shown to include a building status monitor 524. Central plant controller 500 may receive data regarding the overall building or building space to be heated or cooled by system 400 via building status monitor 524. In an exemplary embodiment, building status monitor 524 may include a graphical user interface component configured to provide graphical user interfaces to a user for selecting building requirements (e.g., overall temperature parameters, selecting schedules for the building, selecting different temperature levels for different building zones, etc.).

Central plant controller 500 may determine on/off configurations and operating setpoints to satisfy the building requirements received from building status monitor 524. In some embodiments, building status monitor 524 receives, collects, stores, and/or transmits cooling load requirements, building temperature setpoints, occupancy data, weather data, energy data, schedule data, and other building parameters. In some embodiments, building status monitor 524 stores data regarding energy costs, such as pricing information available from sources 410 (energy charge, demand charge, etc.).

Still referring to FIG. 5, memory 510 is shown to include a load/rate predictor 522. Load/rate predictor 522 may be configured to predict the thermal energy loads ($\hat{\ell}$) of the building or campus for each time step k (e.g., k=1 . . . n) of an optimization period. Load/rate predictor 522 is shown receiving weather forecasts from a weather service 504. In some embodiments, load/rate predictor 522 predicts the thermal energy loads $\hat{\ell}_k$ as a function of the weather forecasts. In some embodiments, load/rate predictor 522 uses feedback from BMS 506 to predict loads $\hat{\ell}_k$. Feedback from BMS 506 may include various types of sensory inputs (e.g., temperature, flow, humidity, enthalpy, etc.) or other data relating to the controlled building (e.g., inputs from a HVAC system, a lighting control system, a security system, a water system, etc.).

In some embodiments, load/rate predictor 522 receives a measured electric load and/or previous measured load data from BMS 506 (e.g., via building status monitor 524). Load/rate predictor 522 may predict loads $\hat{\ell}_k$ as a function of a given weather forecast ($\hat{\phi}_w$), a day type (day), the time of day (t), and previous measured load data ($Y_{k-1}$). Such a relationship is expressed in the following equation:

$$\hat{\ell}_k = f(\hat{\phi}_w, \text{day}, t | Y_{k-1})$$

In some embodiments, load/rate predictor 522 uses a deterministic plus stochastic model trained from historical load data to predict loads $\hat{\ell}_k$. Load/rate predictor 522 may use any of a variety of prediction methods to predict loads $\hat{\ell}_k$ (e.g., linear regression for the deterministic portion and an AR model for the stochastic portion). Load/rate predictor 522 may predict one or more different types of loads for the building or campus. For example, load/rate predictor 522 may predict a hot water load $\hat{\ell}_{Hot,k}$ and a cold water load $\hat{\ell}_{Cold,k}$ for each time step k within the prediction window. In some embodiments, load/rate predictor 522 makes load/rate predictions using the techniques described in U.S. patent application Ser. No. 14/717,593.

Load/rate predictor 522 is shown receiving utility rates from sources 410. Utility rates may indicate a cost or price per unit of a resource (e.g., electricity, natural gas, water, etc.) provided by sources 410 at each time step k in the prediction window. In some embodiments, the utility rates are time-variable rates. For example, the price of electricity may be higher at certain times of day or days of the week (e.g., during high demand periods) and lower at other times of day or days of the week (e.g., during low demand periods). The utility rates may define various time periods and a cost per unit of a resource during each time period. Utility rates may be actual rates received from sources 410 or predicted utility rates estimated by load/rate predictor 522.

In some embodiments, the utility rates include demand charges for one or more resources provided by sources 410. A demand charge may define a separate cost imposed by sources 410 based on the maximum usage of a particular resource (e.g., maximum energy consumption) during a demand charge period. The utility rates may define various demand charge periods and one or more demand charges associated with each demand charge period. In some instances, demand charge periods may overlap partially or completely with each other and/or with the prediction window. Advantageously, demand response optimizer 630 may be configured to account for demand charges in the high level optimization process performed by asset allocator 402. Sources 410 may be defined by time-variable (e.g., hourly) prices, a maximum service level (e.g., a maximum rate of consumption allowed by the physical infrastructure or by contract) and, in the case of electricity, a demand charge or a charge for the peak rate of consumption within a certain period. Load/rate predictor 522 may store the predicted loads $\hat{\ell}_k$ and the utility rates in memory 510 and/or provide the predicted loads $\hat{\ell}_k$ and the utility rates to demand response optimizer 530.

Still referring to FIG. 5, memory 510 is shown to include an incentive estimator 520. Incentive estimator 520 may be configured to estimate the revenue generation potential of participating in various incentive-based demand response (IBDR) programs. In some embodiments, incentive estimator 520 receives an incentive event history from incentive programs 502. The incentive event history may include a history of past IBDR events from incentive programs 502. An IBDR event may include an invitation from incentive programs 502 to participate in an IBDR program in exchange for a monetary incentive. The incentive event history may indicate the times at which the past IBDR events occurred and attributes describing the IBDR events (e.g., clearing prices, mileage ratios, participation requirements, etc.). Incentive estimator 520 may use the incentive event history to estimate IBDR event probabilities during the optimization period.

Incentive estimator 520 is shown providing incentive predictions to demand response optimizer 530. The incentive predictions may include the estimated IBDR probabilities, estimated participation requirements, an estimated amount of revenue from participating in the estimated IBDR events, and/or any other attributes of the predicted IBDR events. Demand response optimizer 530 may use the incentive predictions along with the predicted loads $\hat{\ell}_k$ and utility rates from load/rate predictor 522 to determine an optimal set of control decisions for each time step within the optimization period.

Still referring to FIG. 5, memory 510 is shown to include a demand response optimizer 530. Demand response optimizer 530 may perform a cascaded optimization process to optimize the performance of asset allocation system 400. For example, demand response optimizer 530 is shown to include asset allocator 402 and a low level optimizer 534. Asset allocator 402 may control an outer (e.g., subplant level) loop of the cascaded optimization. Asset allocator 402 may determine an optimal set of control decisions for each time step in the prediction window in order to optimize (e.g., maximize) the value of operating asset allocation system 400. Control decisions made by asset allocator 402 may include, for example, load setpoints for each of subplants 420, charge/discharge rates for each of storage 430, and/or resource purchase amounts for each type of resource purchased from sources 410. In other words, the control decisions may define resource allocation at each time step. The control decisions made by asset allocator 402 are based on the statistical estimates of incentive event probabilities and revenue generation potential for various IBDR events as well as the load and rate predictions.

Low level optimizer 534 may control an inner (e.g., equipment level) loop of the cascaded optimization. Low level optimizer 534 may determine how to best run each subplant at the load setpoint determined by asset allocator 402. For example, low level optimizer 534 may determine on/off states and/or operating setpoints for various devices of the subplant equipment in order to optimize (e.g., minimize) the energy consumption of each subplant while meeting the resource allocation setpoint for the subplant. In some embodiments, low level optimizer 534 receives actual incentive events from incentive programs 502. Low level optimizer 534 may determine whether to participate in the incentive events based on the resource allocation set by asset allocator 402. For example, if insufficient resources have been allocated to a particular IBDR program by asset allocator 402 or if the allocated resources have already been used, low level optimizer 534 may determine that asset allocation system 400 will not participate in the IBDR program and may ignore the IBDR event. However, if the required resources have been allocated to the IBDR program and are available in storage 430, low level optimizer 534 may determine that system 400 will participate in the IBDR program in response to the IBDR event. The cascaded optimization process performed by demand response optimizer 530 is described in greater detail in U.S. patent application Ser. No. 15/247,885.

In some embodiments, low level optimizer 534 generates and provides subplant curves to asset allocator 402. Each subplant curve may indicate an amount of resource consumption by a particular subplant (e.g., electricity use measured in kW, water use measured in L/s, etc.) as a function of the subplant load. In some embodiments, low level optimizer 534 generates the subplant curves by running the low level optimization process for various combinations of subplant loads and weather conditions to generate multiple data points. Low level optimizer 534 may fit a curve to the data points to generate the subplant curves. In other embodiments, low level optimizer 534 provides the data points asset allocator 402 and asset allocator 402 generates the subplant curves using the data points. Asset allocator 402 may store the subplant curves in memory for use in the high level (i.e., asset allocation) optimization process.

In some embodiments, the subplant curves are generated by combining efficiency curves for individual devices of a subplant. A device efficiency curve may indicate the amount of resource consumption by the device as a function of load. The device efficiency curves may be provided by a device manufacturer or generated using experimental data. In some embodiments, the device efficiency curves are based on an initial efficiency curve provided by a device manufacturer and updated using experimental data. The device efficiency curves may be stored in equipment models 518. For some devices, the device efficiency curves may indicate that resource consumption is a U-shaped function of load. Accordingly, when multiple device efficiency curves are combined into a subplant curve for the entire subplant, the resultant subplant curve may be a wavy curve. The waves are caused by a single device loading up before it is more efficient to turn on another device to satisfy the subplant load.

Still referring to FIG. 5, memory 510 is shown to include a subplant control module 528. Subplant control module 658 may store historical data regarding past operating statuses, past operating setpoints, and instructions for calculating and/or implementing control parameters for subplants 420 and storage 430. Subplant control module 528 may also receive, store, and/or transmit data regarding the conditions of individual devices of the subplant equipment, such as operating efficiency, equipment degradation, a date since last service, a lifespan parameter, a condition grade, or other device-specific data. Subplant control module 528 may receive data from subplants 420, storage 430, and/or BMS 506 via communications interface 536. Subplant control module 528 may also receive and store on/off statuses and operating setpoints from low level optimizer 534.

Data and processing results from demand response optimizer 530, subplant control module 528, or other modules of central plant controller 500 may be accessed by (or pushed to) monitoring and reporting applications 526. Monitoring and reporting applications 526 may be configured to generate real time "system health" dashboards that can be viewed and navigated by a user (e.g., a system engineer). For example, monitoring and reporting applications 526 may include a web-based monitoring application with several graphical user interface (GUI) elements (e.g., widgets, dashboard controls, windows, etc.) for displaying key performance indicators (KPI) or other information to users of a GUI. In addition, the GUI elements may summarize relative energy use and intensity across energy storage systems in different buildings (real or modeled), different campuses, or the like. Other GUI elements or reports may be generated and shown based on available data that allow users to assess performance across one or more energy storage systems from one screen. The user interface or report (or underlying data engine) may be configured to aggregate and categorize operating conditions by building, building type, equipment type, and the like. The GUI elements may include charts or histograms that allow the user to visually analyze the operating parameters and power consumption for the devices of the energy storage system.

Still referring to FIG. 5, central plant controller 500 may include one or more GUI servers, web services 512, or GUI engines 514 to support monitoring and reporting applications 526. In various embodiments, applications 526, web services 512, and GUI engine 514 may be provided as separate components outside of central plant controller 500 (e.g., as part of a smart building manager). Central plant controller 500 may be configured to maintain detailed historical databases (e.g., relational databases, XML databases, etc.) of relevant data and includes computer code modules that continuously, frequently, or infrequently query, aggregate, transform, search, or otherwise process the data maintained in the detailed databases. Central plant controller 500 may be configured to provide the results of any such processing to other databases, tables, XML files, or other data structures for further querying, calculation, or access by, for example, external monitoring and reporting applications.

Central plant controller 500 is shown to include configuration tools 516. Configuration tools 516 can allow a user to define (e.g., via graphical user interfaces, via prompt-driven "wizards," etc.) how central plant controller 500 should react to changing conditions in the energy storage subsystems. In an exemplary embodiment, configuration tools 516 allow a user to build and store condition-response scenarios that can cross multiple energy storage system devices, multiple building systems, and multiple enterprise control applications (e.g., work order management system applications, entity resource planning applications, etc.). For example, configuration tools 516 can provide the user with the ability to combine data (e.g., from subsystems, from event histories) using a variety of conditional logic. In varying exemplary embodiments, the conditional logic can range from simple logical operators between conditions (e.g., AND, OR, XOR, etc.) to pseudo-code constructs or complex programming language functions (allowing for more complex interactions, conditional statements, loops, etc.). Configuration tools 516 can present user interfaces for building such conditional logic. The user interfaces may allow users to define policies and responses graphically. In some embodiments, the user interfaces may allow a user to select a pre-stored or pre-constructed policy and adapt it or enable it for use with their system.

Still referring to FIG. 5, central plant controller 500 is shown to include a central plant optimizer (CPO) wizard generator 538 configured to generate a central plant model of the central plant in which central plant controller 500 is implemented and output the central plant model for use in optimization processes by demand response optimizer 530, according to some embodiments. As will be described in greater detail with reference to FIGS. 6-15, CPO wizard generator 538 is configured to receive user input data (e.g., via communications interface 536) consisting of central plant data (e.g., devices, resource loops, geographical location, etc.) to generate a central plant model of the central plant (e.g., central plant 200) in which central plant controller 500 is implemented. In some embodiments, the CPO wizard generator 538 uses the central plant data to generate equipment models of the equipment in the central plant, generates device layers using the equipment models, uses the device layers to form asset layers, and uses the asset layers to generate scale load and rate profiles of the building for which the central plant being modeled produces resources. In some embodiments, the CPO wizard generator 538 outputs a central plant model to demand response optimizer 530 for use in high level optimization processes by asset allocator 402 and low level optimization processes by low level optimizer 534.

CPO Wizard Generator

Figure 6:
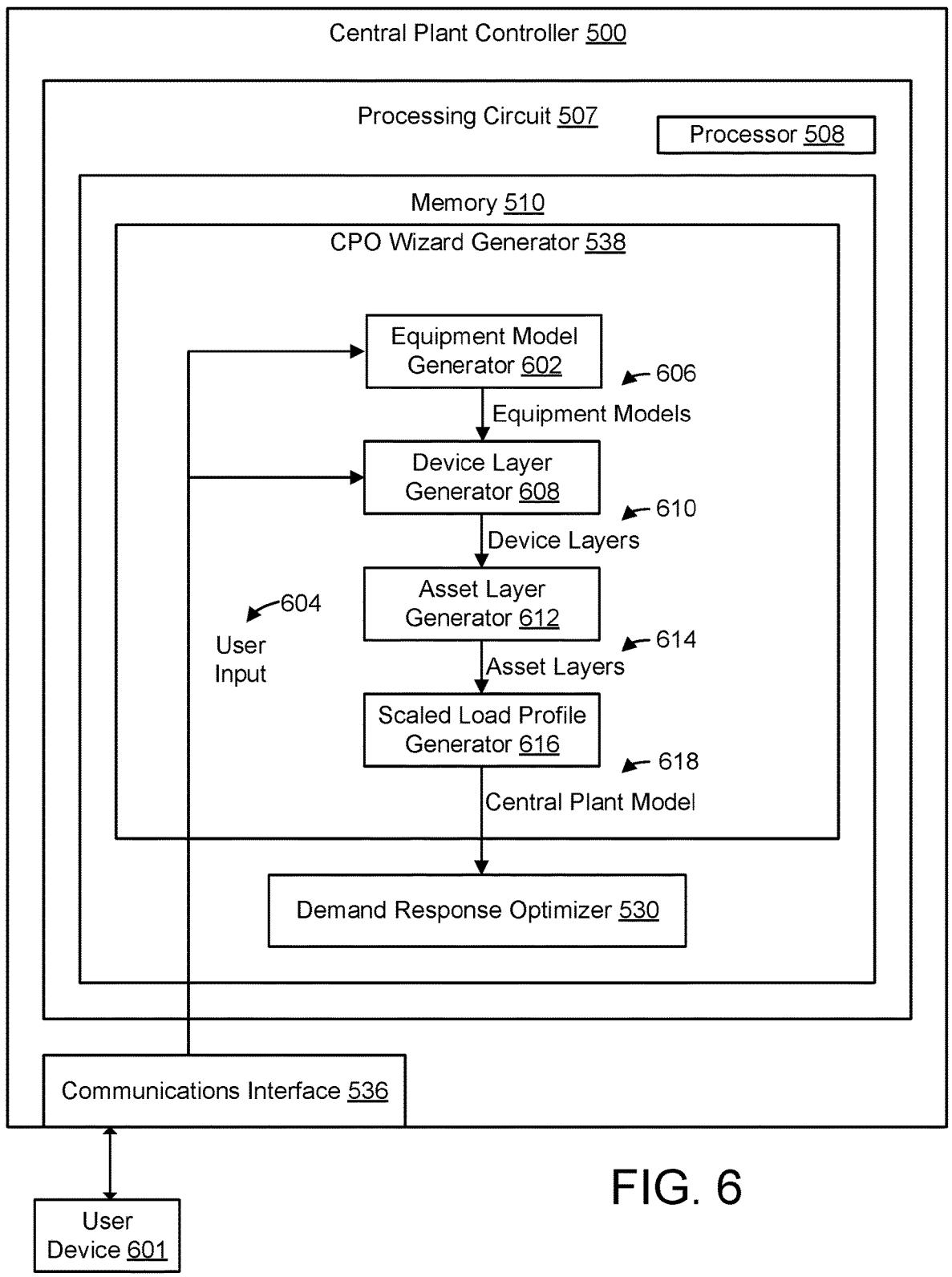
FIG. 6 is a block diagram of the central plant optimizer (CPO) wizard generator implemented in the central plant controller of FIG. 5, according to an exemplary embodiment.

Referring now to FIG. 6, a block diagram illustrating the components of the CPO wizard generator 538 as implemented in central plant controller 500 are shown, according to some embodiments. As previously described, the CPO wizard generator 538 is configured to generate a central plant model of the central plant (e.g., central plant 200) in which the central plant controller 500 is implemented. The central plant model generated by the CPO wizard generator 538 is used by demand response generator 530 in optimization processes to determine resource allocation for the subplants included in the central plant and control decisions for the devices included in the subplants. The CPO wizard generator 538 is shown to include an equipment model generator 602 configured to receive user input 604 from a user device 601 via communications interface 536, according to some embodiments. User device 601 is a cellular phone, terminal, or a computer via which a user enters user input 604 to CPO wizard generator 538, according to some embodiments. In some embodiments, user input 604 includes device data of one or more devices included in the central plant for which CPO wizard generator 538 is generating a central plant model. For example, user input 604 may include characteristics for pumps in a central plant including number of pumps, resource loops (e.g., chilled water loop, hot water loop, etc.) in which each pump is located, design flow characteristics of each pump, design differential pressure of each pump, and design power of each pump. In some embodiments, user input 604 includes central plant data of the central plant for which the CPO wizard generator 538 is generating a central plant model. For example, user input 604 may include a geographical location of the central plant and a climate in which the central plant operates.

In some embodiments, equipment model generator 602 is configured to use the user input 604 to generate an equipment model for each device included in a central plant in which the central plant controller 500 is implemented. In some embodiments, as will be described in greater detail with reference to FIG. 9, the equipment model generator 602 is configured to generate equipment models for use by device layer generator 608 to generate one or more device layers of a central plant. In some embodiments, the equipment model generator 602 is configured to retrieve existing equipment models from an existing equipment model dictionary based on user input 604 identifying devices known by equipment model generator 602. For example, user input 604 may consist of a product number of a device that identifies a device known by equipment model generator 602. With the known device, equipment model generator 602 may be able to retrieve the existing equipment model for the known device from an equipment model dictionary accessible by equipment model generator 602. In some embodiments, as will be described in greater detail with reference to FIG. 9, equipment model generator 602 generates equipment models using device data (e.g., design parameters) included in user input 604.

The equipment model generator 602 is shown to output the equipment models 606 to a device layer generator 608, according to some embodiments. In some embodiments, the device layer generator 608 is configured to use the equipment models 606 generated by the equipment model generator 602 in accordance with information included in user input 604 (e.g., type of resource produced, number of suppliers, number of pumps, identification of equipment, etc.) to generate the device layers 610 for use by demand response optimizer 530 in low level optimization processes. In some embodiments, as will be described in greater detail with reference to FIG. 8, the device layer generator 608 is configured to generate the device layers 610 by forming connections (e.g., hydraulic connections, physical connections, etc.) between each piece of equipment included in a central plant. In some embodiments, the device layers 610 generated by the device layer generator 608 can be further edited by a user to account for particular configurations in which the device layer generator 608 does not account for. For example, a user may input an additional pipe branch between chilled water load coil and a tank.

Still referring to FIG. 6, the device layer generator 608 is shown to output the device layers 610 to asset layer generator 612, according to some embodiments. In some embodiments, as will be described in greater detail with reference to FIG. 11, the asset layer generator 612 is configured to use the device layers 610 to generate the asset layers 614. In some embodiments, asset layer generator 612 is configured to generate subplants including the devices in the device layers 610 and generate subplant models of the subplants. In some embodiments, the asset layers 614 generated by the asset layer generator 612 represent subplants included in the central plant. In some embodiments, the asset layers 614 generated by asset layer generator 612 are used by demand response optimizer 530 in high level optimization processes in order to generate asset allocations.

The asset layer generator 612 is shown to output the asset layers 614 to scaled load profile generator 616, according to some embodiments. In some embodiments, as will be described in greater detail with reference to FIG. 15, the scaled load profile generator 616 is configured to use the asset layers 614 and building characteristics (e.g., climate, geographical location, etc.) included in user input 604 to generate a scaled building load profile of the building in which the central plant controller 500 is implemented. In some embodiments, the scaled load profile generator 616 generates a scaled building load profile for use in optimization processes by demand response optimizer 530. In some embodiments, scaled load profile generator 616 is configured to generate a central plant model 618 including the asset layers 614 generated by asset layer generator 612, the device layers 610 generated by device layer generator 608, and a scaled building load profile.

The scaled load profile generator 616 is shown to output the central plant model 618 to demand response optimizer 530. As previously described with reference to FIG. 5, the demand response optimizer 530 is configured to perform a cascaded optimization process using the central plant model 618 (including the asset layers 614 and device layers 610) generated by the CPO wizard generator 538 to generate control decisions for use by building management system 506. In some embodiments, the central plant model 618 is used by central plant controller 200 to generate expected cost savings between operating the central plant using optimization processes performed by demand response optimizer 530 and operating the central plant in an as-run configuration that does not include optimization processes.

Central Plant Model Generation

Figure 7:
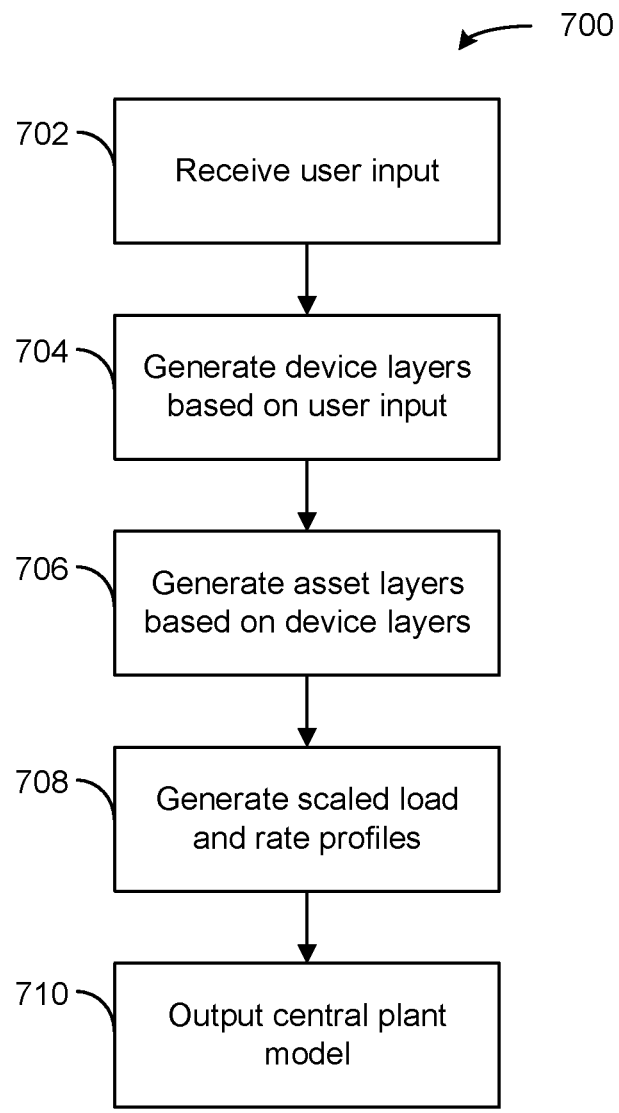
FIG. 7 is a flowchart illustrating the process of generating a plant model that can be performed by the CPO wizard generator of FIG. 6, according to an exemplary embodiment.

Referring now to FIG. 7, a process 700 is shown illustrating the process of generating a central plant model in which a central plant controller (e.g., central plant controller 200) is implemented, according to some embodiments. In some embodiments, the process 700 is performed by the CPO wizard generator 538 and components included therein to generate a central plant model for the plant in which CPO wizard generator 538 is implemented, according to some embodiments. In general, the process 700 involves generating a central plant model using user input including device data and central plant data, according to some embodiments. In some embodiments, the process 700 involves generating a central plant model for use in high level optimization processes performed by asset allocator 402 and low level optimizations processes performed by low level optimizer 534.

Process 700 is shown to involve receiving user input relating to equipment information included in the central plant that is to be modeled and data relating to the central plant (step 702), according to some embodiments. In some embodiments, at step 702, the type of equipment included in the central plant and corresponding number of devices for each type of equipment is entered. In some embodiments, a name is entered for at least some of the devices included in the central plant at step 702. In some embodiments, the types of resource loops included in the central plant and the corresponding number of resource loops for each type of resource loop are entered at step 702. In some embodiments, the type and/or number of each device associated with each resource loop is entered at step 702. In some embodiments, operational data and/or design parameters for at least some of the devices included in the central plant is entered at 702. In some embodiments, characteristics of the central plant being modeled is entered at step 702. In some embodiments, the user input entered in step 702 is received by CPO wizard generator 538 via communications interface 536.

In some embodiments, a user is prompted to enter specific inputs depending on the workflow of the input entered at step 702. For example, a user may first identify a subplant type as chilled water and continue through questions relating to the devices included in the chilled water subplant before proceeding to questions relating to a different subplant. On the contrary, for example, questions may begin at a high level (e.g., asking the user to identify all types of subplants) and then proceed to device-specific questions (e.g., asking the user to identify individual device characteristics that make up each subplant).

Process 700 is shown to involve generating at least one device layer using the received user input (step 704), according to some embodiments. In some embodiments, the device layer generator 608 generates the at least one device layer using the user input entered in step 702. In some embodiments, as will be described in greater detail with reference to FIG. 9, step 704 involves generating at least one equipment model for at least one device identified in the user input entered in step 702. In some embodiments, step 704 involves uses the design parameters of at least one devices included in the user input in order to generate at least one generic equipment model for at least one device. In some embodiments, step 704 involves retrieving at least one equipment model from an equipment model dictionary based on the user input entered in step 702 identifying a known device. In some embodiments, step 704 involves the device layer generator 608 generating connections between at least two devices included in a central to generate at least one device layer. In some embodiments, step 704 involves generating a layout of devices representing the physical locations of devices relative to one another and the corresponding connections between each device for each resource loop.

Still referring to FIG. 7, process 700 is shown to involve generating at least one asset layer using the at least one generated device layers (step 706), according to some embodiments. In some embodiments, step 706 involves asset layer generator 612 generating the at least one asset layer. In some embodiments, as will be described in greater detail with reference to FIG. 11, step 706 involves interpreting the at least one device layer generated in step 704 in order to generate the at least one asset layer for use in high level optimization processes. In some embodiments, step 706 involves generating subplants by grouping together devices of the same type of equipment. In some embodiments, step 706 involves generating resource pools based on the subplant groups. In some embodiments, step 706 involves using the equipment model generated in the step 704 in order to generate a subplant model for each generated subplant.

Process 700 is shown to involve generating a scaled building load profile using the received user input and the at least generated asset layer (step 708), according to some embodiments. In some embodiments, step 708 involves scaled load profile generator 616 generating the scaled building load profile of the building in which the central plant is assigned. In some embodiments, step 708 in part involves determining a normalized load profile based on geographical location of the central plant and/or climate in which the central plant operates. In some embodiments, step 708 involves determining the maximum building load obtainable by the equipment based on the maximum resource production capacity of the equipment. In some embodiments, step 708 involves using the normalized load profile and the maximum building load in order to generate the scaled load profile.

Process 700 is show to involve outputting the central plant model for use in optimization processes (step 710), according to some embodiments. In some embodiments, step 710 involves outputting the central plant model including the at least one asset layer generated in step 706 and the scaled building load profile generated in step 708. In some embodiments, step 710 involve outputting the central plant model to demand response optimizer 530 for use in optimization processes. In some embodiments, step 710 involves outputting the central plant model for use in simulation to predict the operational costs of the central plant as operated using the central plant model.

Device Layer Generation

Figure 8:
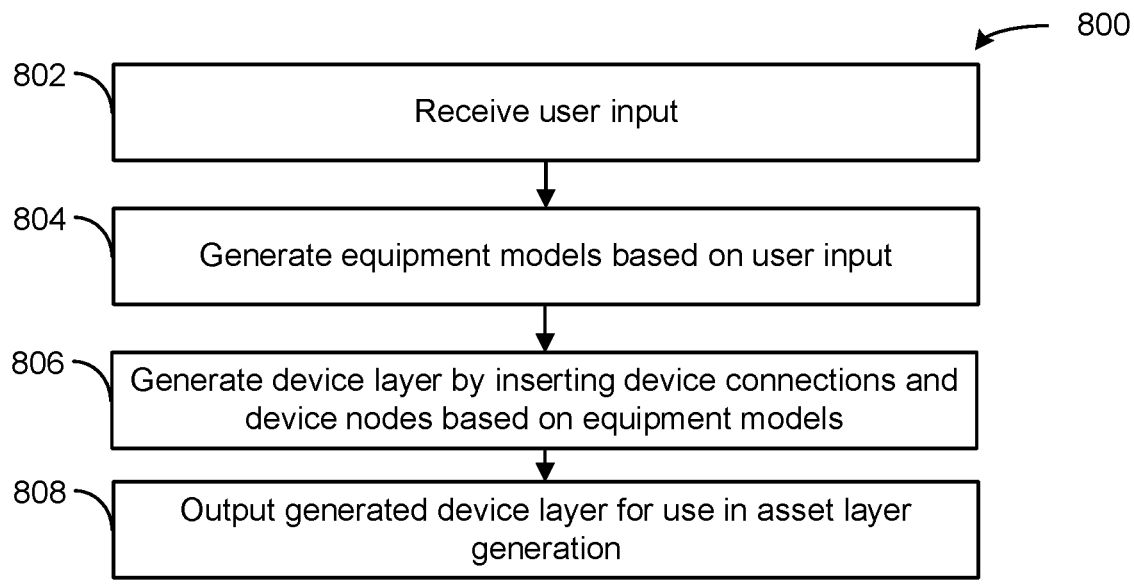
FIG. 8 is a flowchart illustrating the process of generating device layers as part of the process of generating a plant model illustrated in FIG. 7, according to an exemplary embodiment.

Referring now to FIG. 8, a process 800 for generating a device layer for use in generating a central plant model is shown, according to some embodiments. In some embodiments, process 800 is used to generate the device layer as described with reference to step 704 of process 700. The process 800 can be repeated to generate two or more device layers as part of the central plant modeling process 600, according to some embodiments. In some embodiments, process 800 is performed in part by equipment model generator 602 and in part by device layer generator 608. In some embodiments, process 800 is performed in part by device layer generator 608. In some embodiments, the process 800 is repeated based on user input (e.g., user input 604) in which the user input identifies devices to be placed in different device layers.

The process 800 is shown involve receiving user input associated with the equipment that make up the central plant for which a model is being generated (step 802), according to some embodiments. In some embodiments, step 802 involves receiving user input identifying a resource type (e.g., chilled water, hot water, steam, etc.) for the device layer being generated by process 800. In some embodiments, step 802 involves receiving pump identifications and pump characteristics associated with each pump (e.g., drive speed, name, etc.). In some embodiments, step 802 involves an identification of each pump as a primary pump or a secondary pump. In some embodiments, step 802 involves receiving an identification of each device corresponding to the type of resource produced by the device (e.g., chiller, boiler, etc.). In some embodiments, step 802 involves receiving identification of thermal energy storage devices. In some embodiments, step 802 involves receiving identification of a number of load coils (e.g., loads consumed by the building) and corresponding types of load coils. In some embodiments, step 802 involves receiving an identification of a number and/or type of external suppliers (e.g., water supplier, electrical supplier, etc.). In some embodiments, step 802 involves equipment model generator 602 receiving user input 604.

As will be described in greater detail with reference to FIG. 9, process 800 is shown to involve generating equipment models for each of the devices identified by the received user input (step 804), according to some embodiments. In some embodiments, the equipment models generated in step 804 define the operational characteristics of the particular device each equipment model is associated with and are used to generate the device layers for use in generating a central plant model. In some embodiments, step 804 involves equipment model generator 602 generating an equipment model for each device identified by the user information inputted in step 802. In some embodiments, generating each equipment model involves defining the operational characteristics of each device identified by the user input received in step 802. In some embodiments, step 804 involves extracting an existing equipment model from an existing equipment model dictionary. In some embodiments, step 804 involves using device data, design parameters, and equipment coefficients included in the user input received in step 802 to generate an equipment model.

Still referring to FIG. 8, process 800 is shown to involve generating a particular device layer by inserting device connections between devices to represent the physical and/or hydraulic relationships between connected devices (step 806), according to some embodiments. For example, a device connection representing a pipe may be placed between a supply pump and a chiller device to represent the transfer of fluid from the supply pump to the chiller device. In some embodiments, step 806 involves generating device nodes representing the input and output of resources between at least two devices. For example, a device node placed between a supply pump and a chiller device may define the output flow rate from the supply pump as an input to the chiller device. In some embodiments, a user can edit, modify, and/or otherwise change any connections and/or device nodes to further customize the device layer generated in step 806. In some embodiments, the connections and device nodes generated in step 806 are used by demand response optimizer 530 to perform a low level optimization process. At step 808, the device layer generated in step 806 is output for use in an asset layer generation process. In some embodiments, step 808 involves device layer generator 608 outputting each device layer generated in step 806 to asset layer generator 612 for use in generating one or more asset layers.

Figure 9:
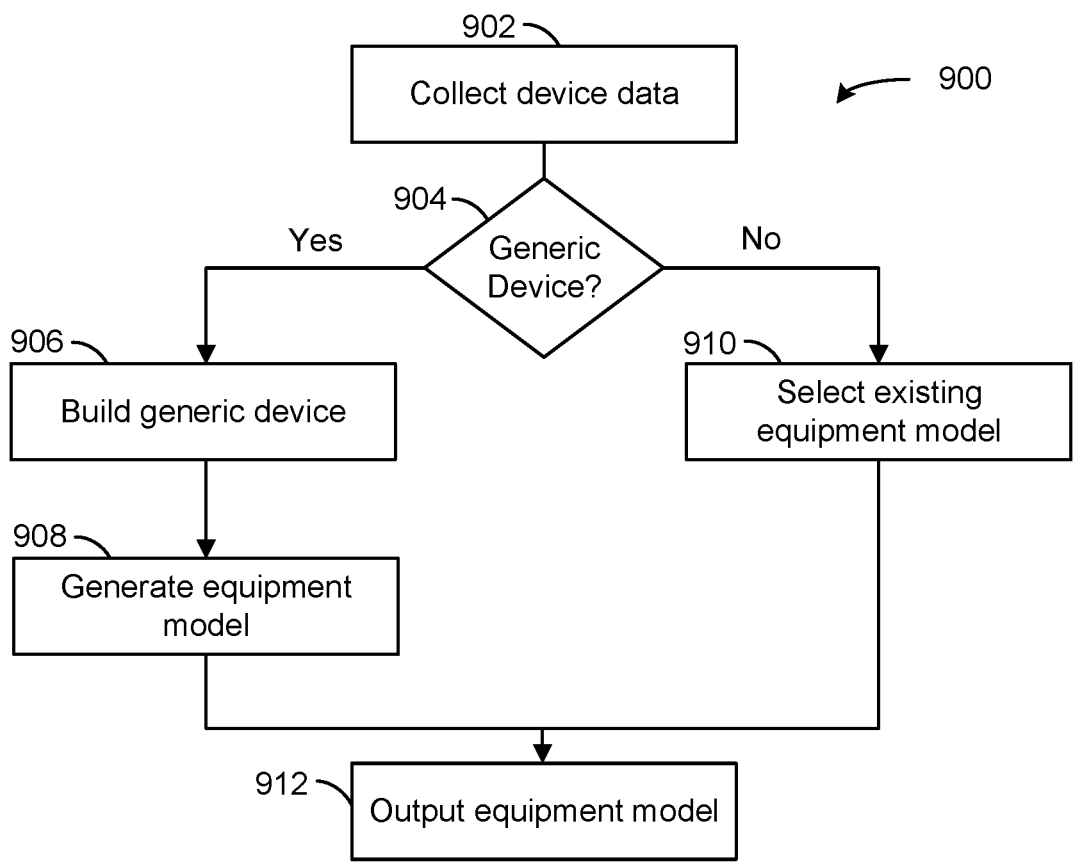
FIG. 9 is a flowchart illustrating the process of generating equipment models for use in the process of generating device layers illustrated in FIG. 8, according to an exemplary embodiment.

Referring now to FIG. 9, a process 900 for generating equipment models for use in generating device layers is shown, according to some embodiments. In some embodiments, process 900 is performed by equipment model generator 602 as part of the device layer generation process 800. Process 900 can be repeated for each device included in a central plant, according to some embodiments. In some embodiments, process 900 is repeated only for different devices. For example, a first equipment model generated for a supply pump using process 900 may be used for a second supply pump of the same type (e.g., product number, model number, design parameters, etc.). Process 900 is shown to involve collecting device data for the one or more devices included in the one or more subplants (step 902), according to some embodiments. In some embodiments, the device data inputted at step 902 is at least some of the user input received in step 802 of process 800. In some embodiments, the device data inputted at step 902 is specific to the type of device identified in order to generate the equipment model. For example, in order to generate an equipment model for a pump, a user may input the design flow parameters for the particular pump, the design change in pressure for the particular pump, and the design power rating for the particular pump. In some embodiments, process 900 is repeated for each device identified in user input (e.g., user input 604) that is received in step 802 of process 800.

Step 904 is shown as a decision whether the particular device for which an equipment model is being generated is considered a generic device, according to some embodiments. In general, if a particular device is considered generic, then the equipment model generator 602 uses the device data collected in step 902 to generate an equipment model for the particular device, according to some embodiments. If a device is not considered generic, then the equipment model generator 602 retrieves an existing equipment model from an equipment dictionary.

If a particular device is determined to be considered generic (e.g., an equipment model does not exist for the particular device based on manufacturer information) at step 904, then process 900 continues with step 906, according to some embodiments. Step 906 involves building the device based on device data collected in step 902, according to some embodiments. In some embodiments, step 906 involves collecting design parameters from the device data collected in step 902 for a particular device type. For example, if the data for a particular device identifies the particular device as a pump, then the equipment model generator 602 will know the required data to build the device includes the design flow of the pump, the design differential pressure of the pump, and the design power rating of the pump.

The design parameters used to build a particular device in step 906 are used to generate an equipment model for the particular device in step 908, according to some embodiments. In some embodiments, step 908 involves the equipment model generator 602 retrieving a generic equipment model from an equipment database in order to generate an equipment model for a particular device using the design parameters. For example, if the particular device for which an equipment model is being built is a pump, then the device layer generator will retrieve a generic pump model and generate a pump curve using the design parameters inputted in step 902.

If, at step 904, the particular device is not determined to be a generic device (e.g., equipment model generator 602 identifies the particular device as an existing device), then process 900 will continue with step 910, according to some embodiments. In some embodiments, step 910 involves the device layer generator 608 to retrieve an existing equipment model from an existing equipment model generator. In some embodiments, the equipment model retrieved in step 910 involves equipment model generator 602 receiving an equipment model that defines the operation of an existing device.

Process 900 is shown to involve outputting an equipment model for a particular device for use in the device layer generation process 800 (step 912), according to some embodiments. In some embodiments, the equipment model output in step 912 is received by device layer generator 608 for use in the device layer generation process 800 illustrated in FIG. 8.

Figure 10:
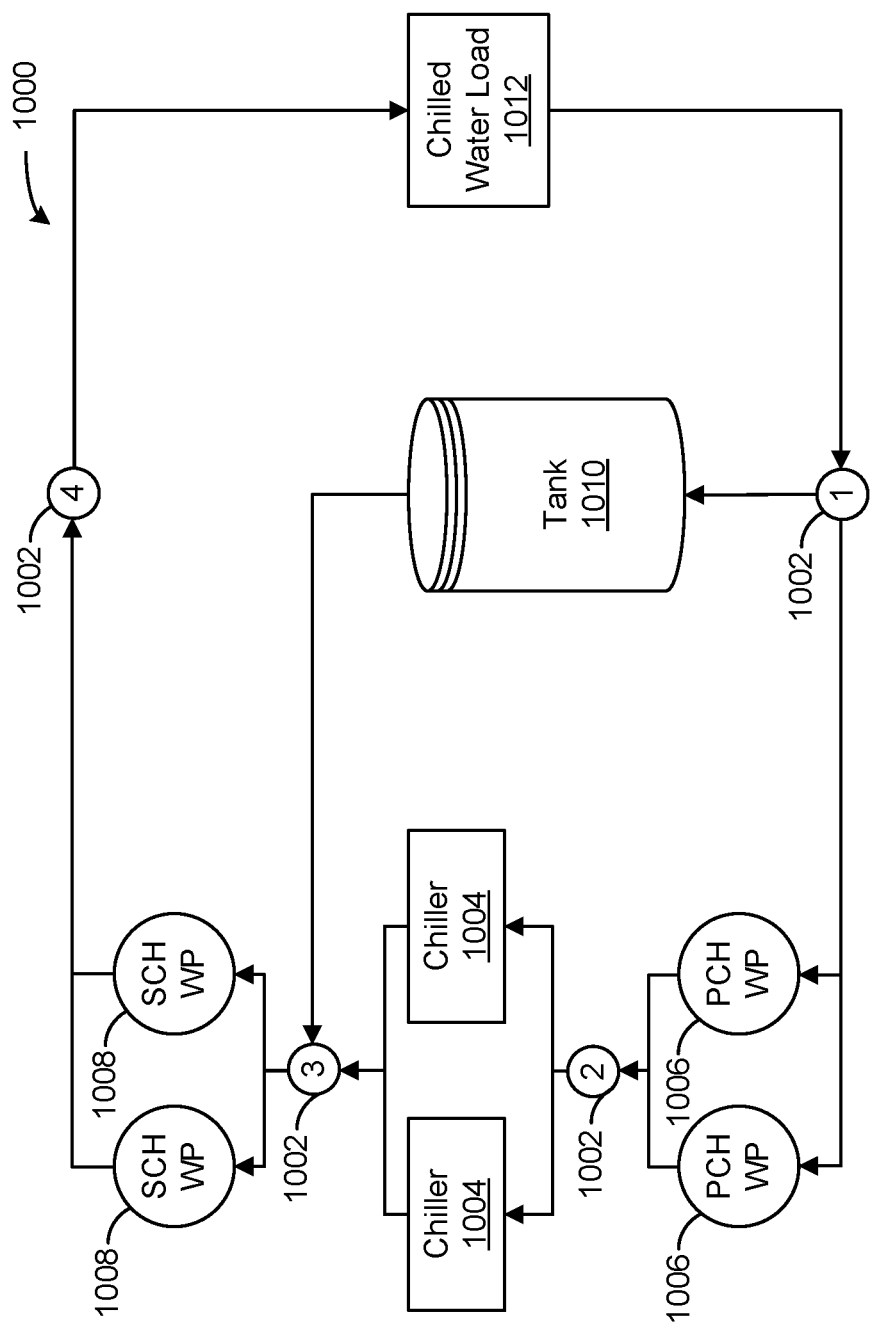
FIG. 10 is a block diagram of a device layer that can be generated using the process illustrated in FIG. 8, according to an exemplary embodiment.

Referring now to FIG. 10, an example device layer 1000 generated by the device layer generator 608 using process 800 is shown, according to some embodiments. The example device layer 1000 is shown to be a chilled water loop, according to some embodiments. The user input received at step 802 included the identification of devices including the chillers 1004, the primary chilled water pumps 1006, the secondary chilled water pumps 1008, the tank 1010, and the chilled water load 1012, according to some embodiments. For each of the devices, an equipment model was generated by equipment model generator 602 using process 900, according to some embodiments. The device nodes 1002 were generated by device layer generator 608 at step 806 to represent the input and output relationship between each device, according to some embodiments. For example, a device node 1002 was placed between primary chilled water pumps 1006 and chillers 1004 to define the output flow rate from the primary chilled water pumps 1006 as an input to the chillers 1004. In some embodiments, the example device layer 1000 is outputted to asset layer generator 612 for use in generating asset layers.

Asset Layer Generation

Figure 11:
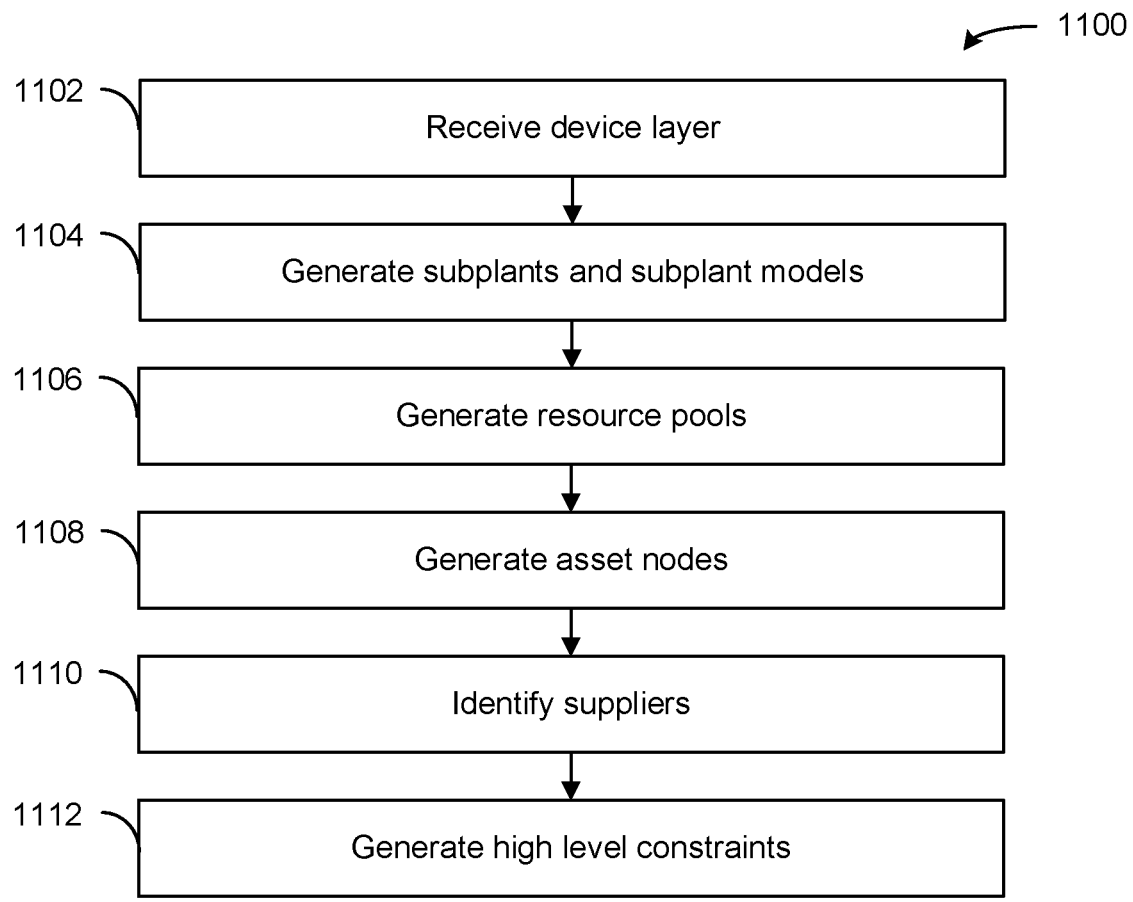
FIG. 11 is a flowchart illustrating the process of generating asset layers as part of the process of generating a plant model illustrated in FIG. 7, according to an exemplary embodiment.

Referring now to FIG. 11, a process 1100 for generating an asset layer as part of the process for generating a central plant model is shown, according to some embodiments. The process 1100 can be repeated to generate each asset layer in a central plant, according to some embodiments. In some embodiments, process 1100 is performed by asset layer generator 612 using at least one device layer generated by device layer generator 608. In some embodiments, the asset layer generated using process 1100 is used by demand response optimizer 530 in a high level optimization process. Process 1100 is shown to involve receiving a device layer (e.g., device layer 610) at step 1102, according to some embodiments. In some embodiments, the device layer received in step 1102 includes equipment models for each device included in the at least one device layer.

Process 1100 is shown to continue with step 1104, according to some embodiments. As will be described in greater detail with reference to FIG. 12, step 1104 involves generating subplants and subplant models using the device layers received in step 1102, according to some embodiments. In some embodiments, the subplants generated in step 1104 involve combining multiple device layers and/or multiple devices included therein into a subplant by detecting common nodes between the multiple devices in the device layer received in step 1102.

Process 1100 is shown to involve generating one or more resource pools using the received device layers and the generated subplant groups (step 1106), according to some embodiments. In some embodiments, generating resource pools involves combining storage devices (e.g., a chilled water tank, a thermal energy storage device) and load coils (e.g., building load, chilled water) into a group to generate the resource pool. In some embodiments, step 1106 involves identifying particular subplants as an input or an output for each generated resource pool. For example, a chiller subplant may be identified as an input to a chilled water resource pool while a cooling tower subplant may be identified as an output of a condenser water resource pool. In some embodiments, suppliers of a resource (e.g., electrical supplier, water supplier, etc.) are identified as inputs to resource pools. In some embodiments, the resource pool type is identified based on user input.

Still referring to FIG. 11, process 1100 is shown to continue with step 1108, according to some embodiments. In some embodiments, step 1108 involves generating asset nodes between the subplants generated in step 1104 and the resource pools generated in step 1106. In some embodiments, the asset nodes generated in step 1108 represent the exchange of resources between the subplants and resource pools involved in the particular asset layer that is being generated. For example, an asset node may be placed between a chiller subplant and a chilled water resource pool representing the chilled water generated by the chiller subplant as an input to a chilled water resource pool.

Process 1100 is shown to involve identifying suppliers in a device layer by searching the received device layers for a supplier of a resource (step 1110), according to some embodiments. In some embodiments, a supplier is a subplant group generated in step 1104. In some embodiments, a supplier is one or more external suppliers (e.g., electrical supplier, water supplier, etc.) from which resources are purchased. In some embodiments, a supplier is a storage device (e.g., a chilled water tank, a thermal energy storage device, etc.). In some embodiments, the suppliers identified in step 1110 are combined into a resource pool.

Still referring to FIG. 11, process 1100 is shown to involve generating high level constraints needed for a high level optimization process (step 1112), according to some embodiments. In some embodiments, asset layer generator 612 generates high level constraints based on user data (e.g., user input received at step 702 of process 700), the device layer received in step 1102, and the subplants generated in step 1104. For example, in step 702 of process 700, a user may input the cold side of free cooling heat exchanger subplant must be placed in the same condenser water loop as an electric centrifugal chiller subplant. However, the free cooling heat exchanger subplant and electric centrifugal chiller subplant cannot operate at concurrent times due to the free cooling heat exchanger subplant requiring much lower temperatures from a cooling tower subplant than the electric centrifugal chiller subplant can physically handle. The asset layer generator 612 will place a high level constraint on the condenser water loop which will signify in the high level optimization process (e.g., the high level optimization process asset allocator 402) that the free cooling heat exchanger subplant and the electric centrifugal chiller subplant cannot operate at the same time. As a result, the high level optimization process will take into account the high level constraint and will produce an optimization result that avoids the free cooling heat exchanges subplant and the electric centrifugal chiller subplant concurrently operating at any time step.

Figure 12:
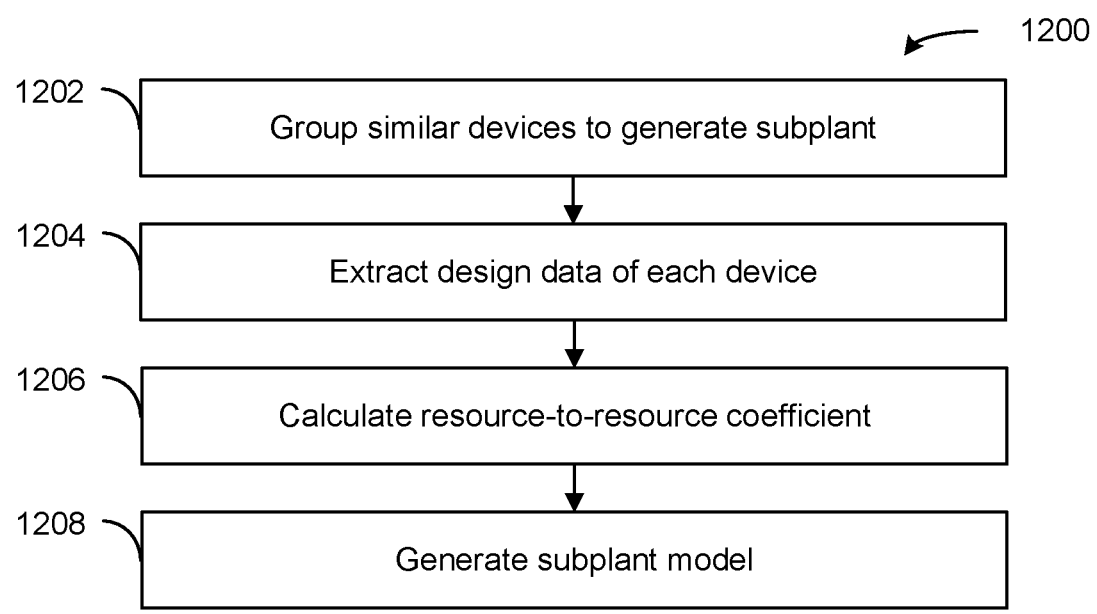
FIG. 12 is a flowchart illustrating the process of generating subplant models for use in the process of generating asset layers illustrated in FIG. 11, according to an exemplary embodiment.

Referring now to FIG. 12, a process 1200 for generating a subplant and a corresponding subplant model is shown, according to some embodiments. The process 1200 can be repeated generate two or more subplants for use in the asset layer generation process 1100, according to some embodiments. In some embodiments, the process 1200 is performed in step 1104 of process 1100. In some embodiments, the process 1200 is shown to begin with step 1202. Step 1202 involves grouping one or more similar devices included in a device layer into a subplant to generate at least one subplant, according to some embodiments. For example, two chiller devices included in a device layer may be grouped together into a single chiller subplant. In some embodiments, step 1202 involves placing individual devices into a subplant. For example, a single cooling tower included in a device layer may be placed into a tower subplant that includes only the single cooling tower.

In some embodiments, step 1202 involves asset layer 712 searching a device layer (e.g., a device layer received in step 1102 of process 1100) for similar devices (e.g., devices that consume and produce the same resources as one another) that are hydraulically connected. For example, with reference to the device layer 1000 of FIG. 10, the chillers 1004 may be grouped together into a single chiller subplant based on similar resource production. In some embodiments, step 1202 involves asset layer generator 612 grouping similar devices based on the user-inputted data of step 702 in process 700.

Process 1200 is shown to involve asset layer generator 612 extracting design data for each device that is grouped into a subplant (step 1204), according to some embodiments. In some embodiments, the asset layer generator 612 extracts the design data included in the user input received in step 802 of process 800. In some embodiments, the design data collected for each device includes maximum capacity of each device to produce a particular resource. In some embodiments, the design data collected for each device includes the power required for each device to produce a particular resource at the maximum capacity.

In some embodiments, the design data extracted for each device in step 1204 is used to calculate a resource-to-resource coefficient for each subplant at step 1206 for use in generating a subplant model at step 1208. The following equation can be used to calculated coefficients:

$$C_1 = \frac{\sum_n^N P_n}{\sum_n^N Cap_n}$$

In the previous equation, $C_1$ is the resource-to-resource coefficient, $P_n$ is the required power for device n to produce a particular resource at a maximum capacity $Cap_n$ of device n, and where devices n=1:N.

At step 1208, the resource-to-resource coefficient calculated for each subplant in step 1206 is used to generate a subplant model for each subplant generated in step 1202, according to some embodiments. In some embodiments, a linear equation is fit between an intercept value of $C_0=0$ and the calculated resource-to-resource coefficient $C_1$ calculated in step 1206 for the corresponding subplant. The linear equation generated can be used in high level optimization processes, according to some embodiments.

Figure 13:
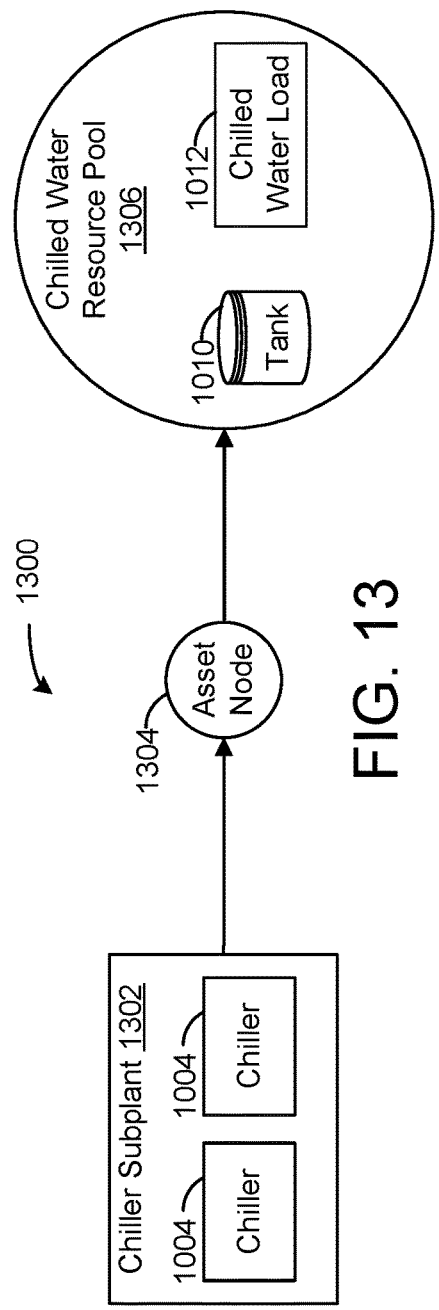
FIG. 13 is a first block diagram illustrating an asset layer that can be generated using the process illustrated in FIG. 11, according to an exemplary embodiment.

Referring now to FIG. 13, a block diagram of an asset layer portion 1300 formed from the device layer 1000 is shown, according to some embodiments. In some embodiments, the asset layer portion 1300 is one portion of a total asset layer that combines multiple asset layers. The chillers 1004 are grouped to form a chiller subplant 1302, according to some embodiments. The tank 1010 and chilled water load 1012 are grouped to form a chilled water resource pool 1306, according to some embodiments. In some embodiments, an asset node 1304 is placed between chiller subplant 1302 and chilled water resource pool 1306 representing the exchange of resources between chiller subplant 1302 and chilled water resource pool 1306. The asset layer portion 1300 can be used in high level optimization processes to determine subplant allocation for chiller subplant 1302, according to some embodiments.

Figure 14:
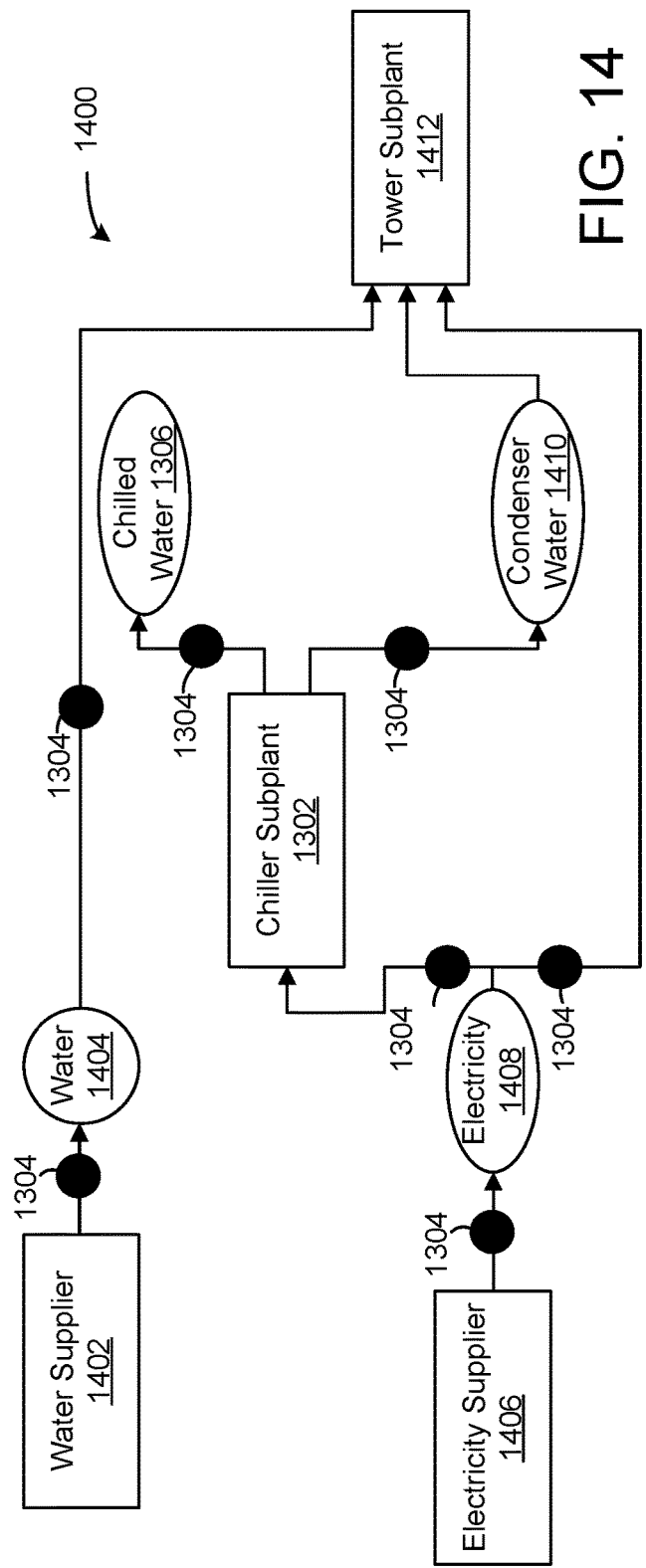
FIG. 14 is a second block diagram illustrating an asset layer that can be generated using the process illustrated in FIG. 11, according to an exemplary embodiment.

Referring now to FIG. 14, a block diagram of a total asset layer 1400 as can be generated by performing process 1200 is shown, according to some embodiments. Total asset layer 1400 is shown to include asset nodes 1304 representing the exchange of resources between the suppliers, subplants, and resource pools, according to some embodiments. The water supplier 1402 is shown to provide a water resource 1404 to tower subplant 1412, according to some embodiments. Likewise, an electricity supplier 1406 is shown to provide an electricity resource 1408 to chiller subplant 1302 and tower subplant 1412. Water supplier 1402 and electricity supplier 1406 may be any utility capable of providing water resource 1404 and electricity resource 1408. For example, electricity supplier 21406 may be an array of solar panels configured to provide electricity resource 1408 for the building.

The total asset layer 1400 can be used in high level optimization processes to determine one or more subplant allocations, according to some embodiments. For example, a high level optimization process performed by asset allocator 402 can determine the allocation of electricity resource 1408 to chiller subplant 1302 and/or tower subplant 1412. Further, in some embodiments, the total asset layer 1400 can be used in a low optimization process to determine one or more individual devices included in a subplant receive the subplant allocation. For example, a low level optimization process performed by low level optimizer 534 can determine one or more chillers devices included in chiller subplant 1302 to operate based on the subplant allocation determined by asset allocator 402 using the total asset layer 1400.

Scaled Load Profile Generation

Figure 15:
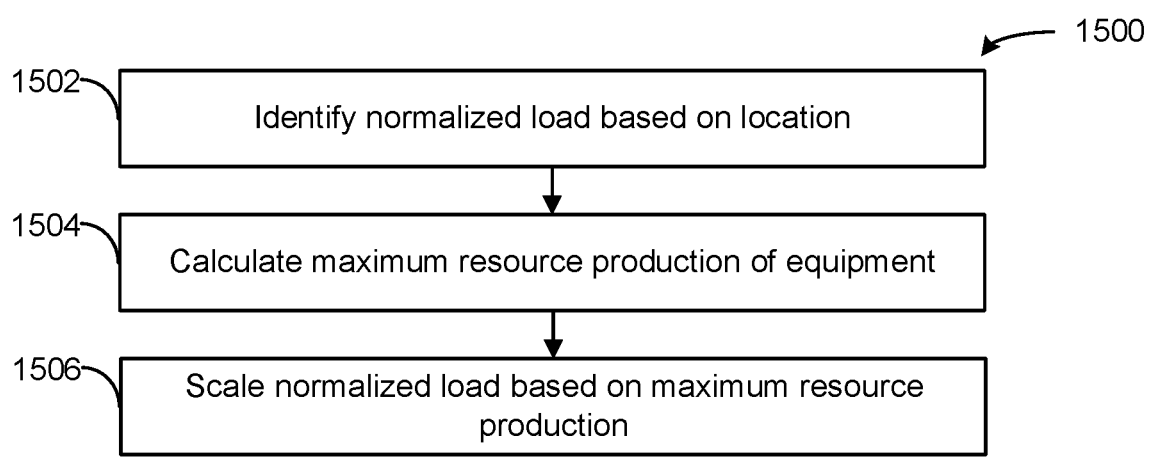
FIG. 15 is a flowchart illustrating a process of generating scaled load profiles as part of the process of generating a plant model illustrated in FIG. 7, according to an exemplary embodiment.

Referring now to FIG. 15, a process 1500 for generating a scaled building load profile is shown, according to some embodiments. In some embodiments, the process 1500 is performed by the scaled load profile generator 616 of the CPO wizard generator 538, according to some embodiments. The process 1500 is performed to generate a load profile for the building in which the central plant being modeled is implemented, according to some embodiments. In some embodiments, the process 1500 involves generating an 8760-time step time series of scaled build load values for use in optimization processes.

Process 1500 is shown to begin with step 1502, according to some embodiments. In some embodiments, the normalized load is a scaling factor value defining the percentage of a total building load a central plant responds to at each time step in an optimization period. At step 1502, the normalized load is identified based on the geographical location of the building in which the central plant being modeled is located, according to some embodiments. In some embodiments, the geographical location is identified by the user-inputted data received in step 702 of process 700. In some embodiments, step 1502 involves determining a region to which the geographical location of the central plant corresponds to. In some embodiments, step 1502 involves identifying a specific building load profile based on a dictionary of normalized loads corresponding to location. For example, a central plant located in Kent, Ohio may be identified with a location in a "Midwest Region," the normalized load for the "Midwest Region" is extracted from a dictionary of normalized load profiles, and the normalized load for the "Midwest Region" is applied to the particular central plant located in Kent, Ohio.

For each time step in the time series, the normalized load defines a value ranging between 0 and 1 representing the percentage of the maximum load the building will experience based on the region and/or geographical location, according to some embodiments. For example, the normalized load may define a value of 0.4 at a time step of t=4 indicating that the building will experience 40% of its maximum building load at time step t=4. In some embodiments, the normalized load value changes in one or more time steps.

At step 1504 of process 1500, the maximum resource production capacity of the equipment are calculated, according to some embodiments. In some embodiments, step 1504 involves identifying which devices are included in the same loop in which the building load coil is placed. In some embodiments, step 1504 involves summing the individual capacities of each device in order to determine a maximum resource production of the devices included in the loop in which the building load coil is placed. The total capacity of the devices included in the same resource loop as the building load can be calculated using the following equation:

$$C_T = \sum_n^N C_n$$

In the previous equation, $C_T$ represents the total capacity of the devices included in the same resource loop as the building load, $C_n$ is the capacity of device n included in the resource loop where the devices n=1:N.

Process 1500 is shown to proceed with step 1506, according to some embodiments. In some embodiments, step 1506 involves scaling the maximum resource production capacity calculated in step 1504 by the normalized load determined in step 1502. Scaling the maximum resource production capacity by the normalized load can be represented by the following equation:

$$C_S = C_T * L_N$$

where $C_S$ is the scaled building load profile, $C_T$ is the total capacity of the devices included in the same resource loop as the building load calculated in step 1504, and $L_N$ is the normalized load value of the building based on geographical location of the building determined in step 1502.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for a central plant comprising one or more devices that operate to serve one or more energy loads of a building using a central plant model, the system comprising:
    one or more memory devices having instructions stored thereon that, when executed by one or more processors, cause the one or more processors to perform operations comprising:
        receiving a plurality of user inputs comprising characteristics of the one or more devices; generating one or more equipment models based on the characteristics of the one or more devices, wherein each of the one or more equipment models is associated with one of the one or more devices;
        generating one or more device layers, wherein each of the one or more device layers comprise at least one of the one or more devices and the one or more equipment models associated with the one or more devices included in the one or more device layers;
        generating at least one asset layer using the one or more device layers, the at least one asset layer comprising a combined asset characteristic generated using the characteristics of the one or more devices included in the one or more device layers;
        generating a scaled building load profile of the building using the at least one asset layer and the plurality of user inputs by scaling an initial load profile of the building to the combined asset characteristic of the at least one asset layer;
        generating the central plant model using the at least one asset layer and the scaled building load profile; and
        using the central plant model to determine a plurality of control decisions for the one or more devices included in the central plant.

2. The system of claim 1, the operations further comprising generating at least one of the one or more equipment models by retrieving an existing equipment model from an equipment model dictionary.

3. The system of claim 1, the operations further comprising generating at least one of the one or more equipment models by calculating a generic equipment model using the plurality of user inputs, wherein the plurality of user inputs defines one or more design parameters of the one or more devices.

4. The system of claim 1, the operations further comprising generating one or more device nodes for each of the one or more device layers, wherein each of the one or more device nodes is located between the one or more devices included in the one or more device layers.

5. The system of claim 1, the operations further comprising generating one or more subplants comprising at least one of the one or more devices included in the one or more device layers.

6. The system of claim 1, the operations further comprising:
    generating a resource-to-resource coefficient for each of the one or more subplants; and
    generating a subplant model using the resource-to-resource coefficient.

7. The system of claim 1, the operations further comprising:
    determining a normalized load of the building based on a geographical location of the building included in the plurality of user inputs;
    determining a maximum resource production capacity value of the one or more devices included in the at least one asset layer; and calculating the scaled building load profile using the normalized and the maximum resource production capacity value.

8. A method for controlling a central plant having one or more devices operating to serve one or more energy loads of a building using a central plant model, the method comprising:
  receiving a plurality of user inputs comprising characteristics of the one or more devices in the central plant and a plurality of central plant data;
  generating one or more equipment models based on the characteristics of the one or more devices, wherein each of the one or more equipment models is associated with one of the one or more devices;
  generating one or more device layers, wherein each of the one or more device layers comprises at least one of the one or more devices and the one or more equipment models associated with the one or more devices included in the one or more device layers;
  generating at least one asset layer using the one or more device layers, the at least one asset layer comprising a combined asset characteristic generated using the characteristics of the one or more devices included in the one or more device layers;
  generating a scaled building load profile of the building using the at least one asset layer and the plurality of user inputs by scaling an initial load profile of the building to the combined asset characteristic of the at least one asset layer;
  generating the central plant model using the at least one asset layer and the scaled building load profile;
  determining a plurality of control decisions for the one or more devices included in the central plant; and
  controlling the one or more devices included in the central plant using the plurality of control decisions.

9. The method of claim 8, wherein generating the one or more equipment models involves retrieving an existing equipment model from an equipment model dictionary for at least one of the one or more devices included in the central plant.

10. The method of claim 8, wherein generating the one or more equipment models involves calculating a generic equipment model using the plurality of user inputs for at least one of the one or more devices included in the central plant.

11. The method of claim 8, wherein generating the one or more device layers involves generating one or more device nodes for each of the one or more device layers, wherein each of the one or more device nodes is located between the one or more devices included in the one or more device layers.

12. The method of claim 8, wherein generating the at least one asset layer using the one or more device layers further involves generating one or more subplants comprising at least one of the one or more devices included in the one or more device layers.

13. The method of claim 12, wherein generating the one or more subplants further involves:
  calculating a resource-to-resource coefficient for each of the one or more subplants; and
  generating a subplant model using the resource-to-resource coefficient for each of the one or more subplants.

14. The method of claim 8, wherein generating the scaled building load profile of the building further involves:
  determining a normalized load of the building based on a geographical location of the building included in the plurality of user inputs;
  determining a maximum resource production capacity value of the one or more devices included in the at least one asset layer; and
  calculating the scaled building load profile using the normalized and the maximum resource production capacity value.

15. A control system for a central plant having one or more devices that operate to serve one or more energy loads of a building using a central plant model, the control system comprising:
  one or more memory devices having instructions stored thereon that, when executed by one or more processors, cause the one or more processors to perform operations comprising:
    receiving a plurality of user inputs comprising characteristics of the one or more devices;
    generating one or more equipment models based on the characteristics of the one or more devices, wherein each of the one or more equipment models is associated with one of the one or more devices included in the central plant;
    generating one or more device layers, wherein each of the one or more device layers comprise at least one of the one or more devices and the one or more equipment models associated with the one or more devices included in the one or more device layers;
    generating at least one asset layer using the one or more device layers, the at least one asset layer comprising a combined asset characteristic generated using the characteristics of the one or more devices included in the one or more device layers;
  generating a scaled building load profile of the building using the at least one asset layer and the plurality of user inputs by scaling an initial load profile of the building to the combined asset characteristic of the at least one asset layer;
  generating the central plant model using the at least one asset layer and the scaled building load profile; and
  using the central plant model to determine a plurality of control decisions for the one or more devices included in the central plant.

16. The control system of claim 15, the operations further comprising generating at least one of the one or more equipment models by retrieving an existing equipment model from an equipment model dictionary.

17. The control system of claim 15, the operations further comprising generating at least one of the one or more equipment models by calculating a generic equipment model using the plurality of user inputs, wherein the plurality of user inputs defines one or more design parameters of the one or more devices.

18. The control system of claim 15, the operations further comprising generating one or more device nodes for each of the one or more device layers, wherein each of the one or more device nodes is located between the one or more devices included in the one or more device layers.

19. The control system of claim 15, the operations further comprising:
  generating a resource-to-resource coefficient for each of the one or more subplants; and
  generating a subplant model using the resource-to-resource coefficient.

20. The control system of claim 15, the operations further comprising:
  determining a normalized load of the building based on a geographical location of the building included in the plurality of user inputs;

determining a maximum resource production capacity value of the one or more devices included in the at least one asset layer; and calculating the scaled building load profile using the normalized and the maximum resource production capacity value.

\* \* \* \* \*